United States Patent
Sadi et al.

(10) Patent No.: US 11,249,720 B2
(45) Date of Patent: Feb. 15, 2022

(54) HIGH PERFORMANCE MERGE SORT WITH SCALABLE PARALLELIZATION AND FULL-THROUGHPUT REDUCTION

(71) Applicant: Carnegie Mellon University, Pittsburgh, PA (US)

(72) Inventors: Fazle Sadi, Pittsburgh, PA (US); Larry Pileggi, Pittsburgh, PA (US); Franz Franchetti, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 87 days.

(21) Appl. No.: 16/688,055

(22) Filed: Nov. 19, 2019

(65) Prior Publication Data

US 2020/0159492 A1     May 21, 2020

Related U.S. Application Data

(60) Provisional application No. 62/917,113, filed on Nov. 19, 2018.

(51) Int. Cl.
| | |
|---|---|
| *G06F 7/16* | (2006.01) |
| *G06F 7/49* | (2006.01) |
| *G06F 16/901* | (2019.01) |
| *G06F 9/30* | (2018.01) |
| *G06F 9/54* | (2006.01) |
| *G06F 7/499* | (2006.01) |

(52) U.S. Cl.
CPC .................. *G06F 7/16* (2013.01); *G06F 7/49* (2013.01); *G06F 7/49942* (2013.01); *G06F 9/30079* (2013.01); *G06F 9/544* (2013.01); *G06F 16/9027* (2019.01)

(58) Field of Classification Search
CPC ..................................... G06F 7/14; G06F 7/16
See application file for complete search history.

(56) References Cited

U.S. PATENT DOCUMENTS

| | | | |
|---|---|---|---|
| 3,418,632 A * | 12/1968 | Batcher ..................... | G06F 7/32 340/146.2 |
| 5,220,664 A * | 6/1993 | Lee .......................... | G06F 7/32 |
| 2015/0269119 A1* | 9/2015 | Sreedhar ............. | G06F 9/30021 712/22 |

OTHER PUBLICATIONS

Lee et al., "A Multiway Merge Sorting Network". IEEE, pp. 111-115. (Year: 1995).*
Shi et al., "An Enhanced Multiway Sorting Network Based on n-Sorters", pp. 1-13. (Year: 2014).*

* cited by examiner

*Primary Examiner* — Chuong D Ngo
(74) *Attorney, Agent, or Firm* — Kacvinsky Daisak Bluni PLLC

(57) ABSTRACT

Disclosed herein is a novel multi-way merge network, referred to herein as a Hybrid Comparison Look Ahead Merge (HCLAM), which incurs significantly less resource consumption as scaled to handle larger problems. In addition, a parallelization scheme is disclosed, referred to herein as Parallelization by Radix Pre-sorter (PRaP), which enables an increase in streaming throughput of the merge network. Furthermore, high performance reduction scheme is disclosed to achieve full throughput.

5 Claims, 18 Drawing Sheets

Figure 6

{x x x ... x x x , x x x ... x x x x x x} key — radix used for PRaP pre-sort ($q$ LSBs) — value record

HIGH PERFORMANCE MERGE SORT WITH SCALABLE PARALLELIZATION AND FULL-THROUGHPUT REDUCTION

RELATED APPLICATIONS

This application claims the benefit of U.S. Provisional Patent Application No. 62/917,113 filed Nov. 19, 2018, the contents of which are incorporated herein by reference in their entirety.

GOVERNMENT INTEREST

This invention was made with government support under contracts HR0011-13-2-0007 and HR0011-16-C-0038 awarded by the Defense Advanced Research Projects Agency (DARPA), and contract N66001-12-C-2008 awarded by the Intelligence Advanced Research Projects Activity (IARPA). The government has certain rights in the invention.

BACKGROUND OF THE INVENTION

Multi-way Merge Sort (MMS) is a fundamental operation for a plethora of applications in high performance computing, graphs algorithms, sparse matrix operations, machine learning, scientific research, etc. However, achieving high throughput for MMS binary tree hardware implementation is difficult. Furthermore, when the problem set grows larger, MMS hardware require exponentially more resources for compute and storage, which makes it not easily scalable and parallelizable. Also, full throughput and parallel reduction on the values of the sorted output is required in many cases.

SUMMARY OF THE INVENTION

Disclosed herein is a multi-way merge sort (MMS) implemented in custom hardware that provides higher performance and is more scalable than prior art solutions. This design may be implemented in a custom architectures. The novelty of the MMS hardware can be attributed to the combination of a few techniques, namely advanced comparison, hybrid memory based binary tree, radix pre-sort parallelization, full throughput reducer and parallel shift reduction. This hardware can be used to accelerate matrix/graph operations, such as Sparse Matrix-Vector Multiplication (SpMV).

BRIEF DESCRIPTION OF THE DRAWINGS

FIG. 6 CLAM hardware diagram (excluding pipeline registers) and initialization operation at work cycle $t_w+1$ and $t_w+2$. The solid and dashed paths show the active paths during initialization work cycles $t_w+1$ and $t_w+2$ respectively.

FIG. 11 shows the radix selection for pre-sort in PRaP.

FIG. 13 is a diagram, showing load balancing and synchronization by insertion of missing keys in PRaP when the output is dense.

DETAILED DESCRIPTION

Many important kernels, such as Sparse Matrix dense Vector multiplication (SpMV) and Sparse General Matrix-Matrix multiplication (SpGEMM), require a large parallel and scalable multi-way merge network. Disclosed herein is a novel, multi-way merge network, referred to herein as "Hybrid Comparison Look Ahead Merge" (HCLAM), which incurs significantly less resources as it is scaled to handle larger problems. Also disclosed is a parallelization scheme, referred to herein as "Parallelization by Radix Pre-sorter" (PRaP), which enables an increased streaming throughput of the merge network without prohibitive demand of on-chip memory.

Scalability

Figure 1:
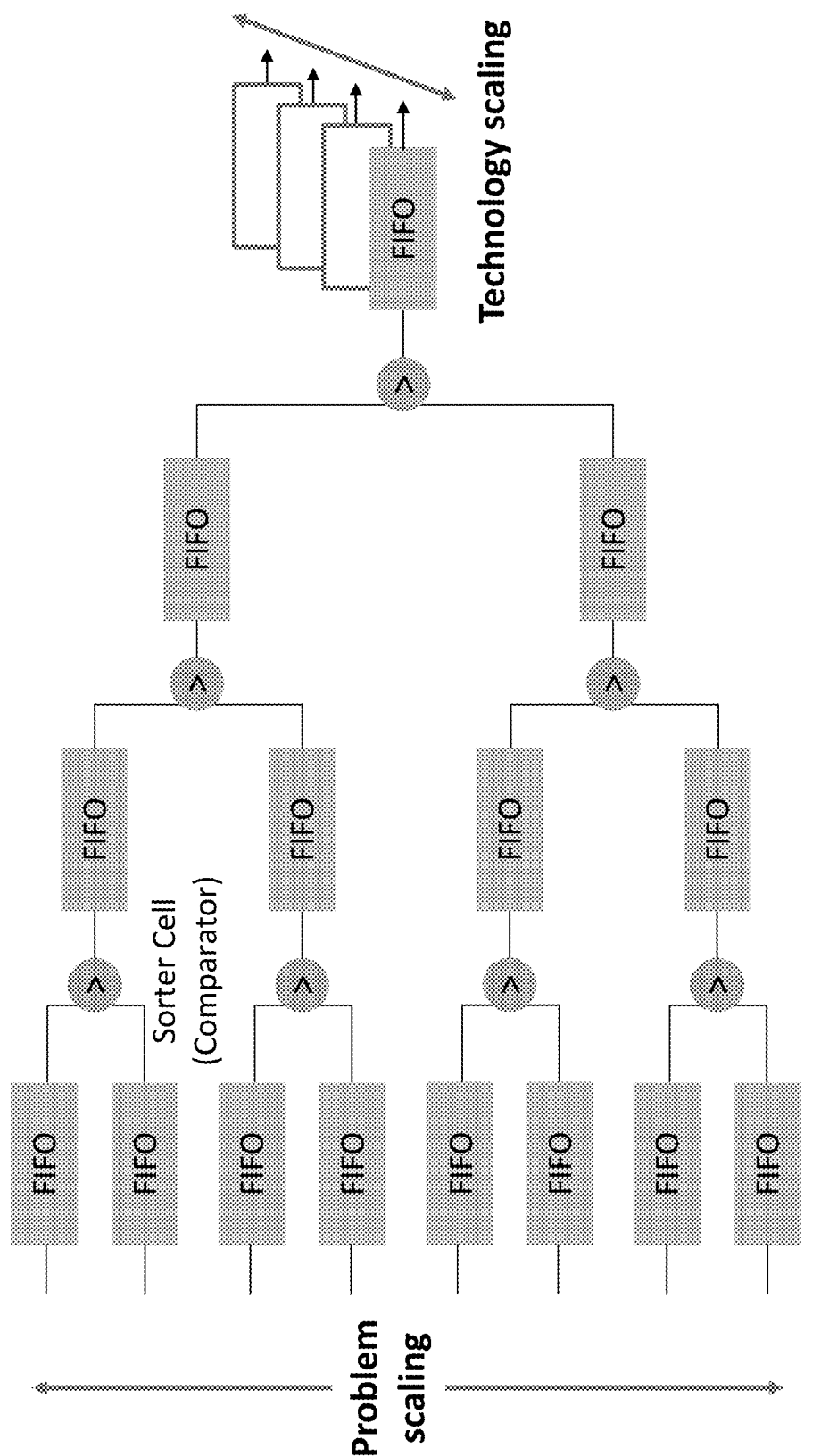
FIG. 1 is a block diagram showing the problem of scaling in a binary tree implementation of naive multi-way merge network.

From the perspective of hardware implementation and performance, scalability can be viewed from two distinct aspects, which are (1) problem scaling and (2) technology scaling. FIG. 1 shows how problem scaling and technology scaling affect a multi-way merge binary tree implementation. Problem scaling is a phenomenon wherein the input data set becomes larger. For example, when the matrix dimension (i.e. the number of nodes in the graph), becomes larger for SpMV, more lists are required to be merged in the second step of the two-step algorithm. As a result, the required number of sorter cells and FIFOs grows exponentially. Therefore, for practical feasibility, the hardware design should be able to handle a growing matrix size without prohibitively requiring more hardware resources or sacrificing performance.

On the other hand, the design of any algorithm or hardware is expected to take full advantage of new technologies with extended capabilities. For example, 3D stacked high-bandwidth memory (HBM) technology enables extreme off-chip bandwidth. As many sparse matrix kernels should ideally be memory bandwidth bound, accelerators in this domain are expected to properly utilize the extreme bandwidth offered by this new technology. For a single multi-way merge tree hardware, where the maximum output rate is one element per cycle, delivering enough throughput to saturate such high bandwidth is another major challenge. Additionally, maintaining balanced throughput for multiple DRAM channels poses further challenges.

A multi-way merge solution that can practically address both of these scalability issues is unknown. The multi-way merge hardware design disclosed herein address both problem and technology scaling, while being practically feasible for custom hardware platforms, such as Application Specific Integrated Circuits (ASIC) and Field Programmable Gate Arrays (FPGA).

Figure 2:
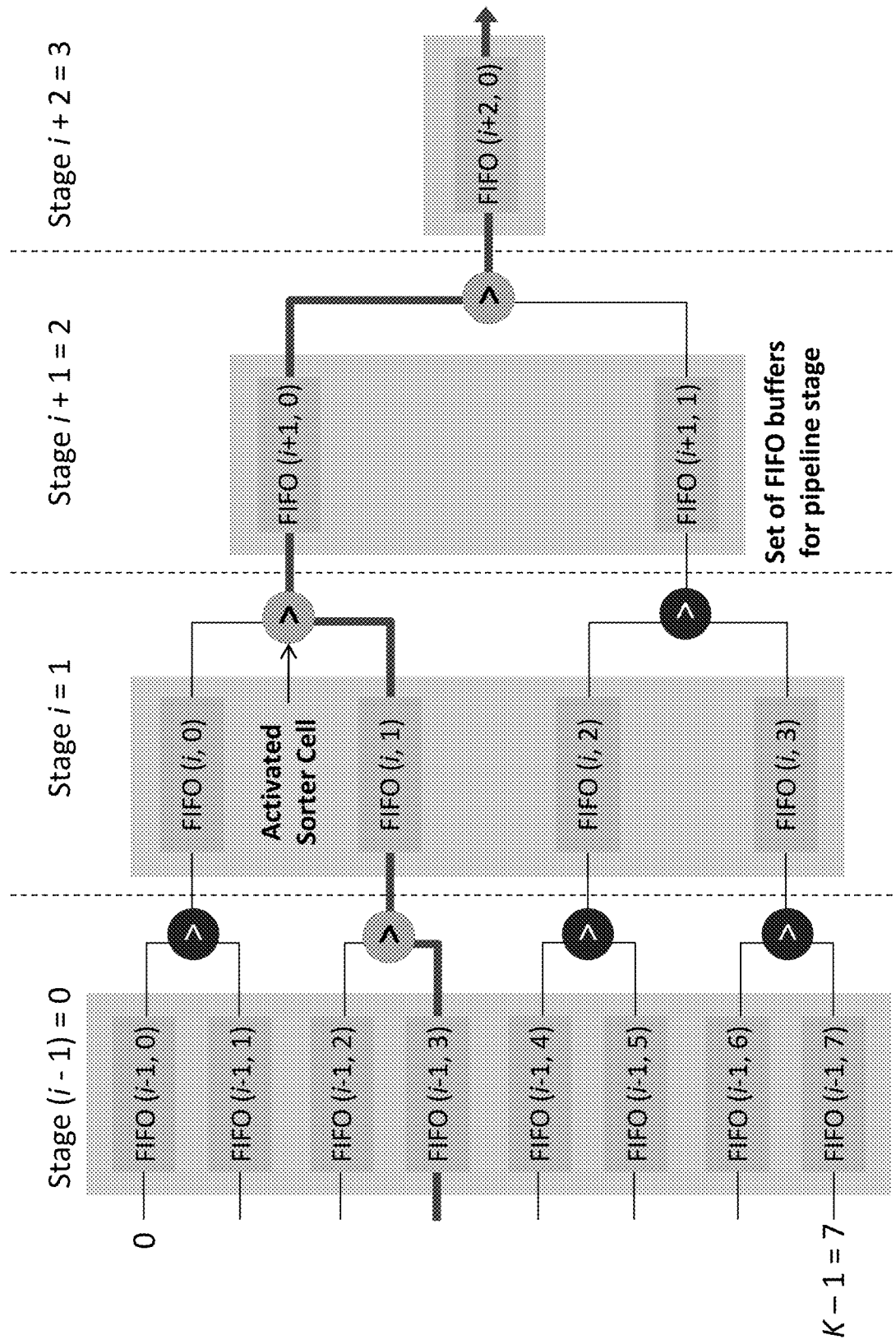
FIG. 2 is a block diagram showing a pipelined multi-way merge binary tree implemented using independent register based FIFOs (IRFM).

FIG. 2 depicts a basic hardware binary tree for merging K sorted lists, hence a K-way merge network. The highlighted line represents the activated path in a given clock cycle. For this particular example, K=8. Each element of the lists is a key-value pair, which is referred to as a "record". In this context, "read" means accessing a certain entry in the FIFO and "dequeue" means updating the counter of the FIFO that is being read. Data "write" and "queue" both mean the same in this context, that is making an entry in the buffer and updating the counter of a FIFO.

The basic building blocks of this tree are sorter cells (comparators) and FIFOs. Each sorter cell compares the keys from the two connected FIFOs and dequeues the record (key-value pair) with the smaller key. To improve clock frequency, the merge tree is further divided into pipelined stages by storing the output of sorter cells in pipeline registers. The total number of stages can be calculated as S=log K+1 and the stage number starts from 0 at leaf level. The most straight-forward hardware implementation uses register-based FIFOs and a total of K−1 sorter cells. For any particular pipeline stage and at any given clock cycle, only one sorter cell remains active in steady state.

A record is dequeued from a FIFO only if the connected sorter in the next stage is active and has the smaller key. Similarly, a record is queued to a FIFO only if it is not entirely full. This implementation is referred to as Independent Register FIFO based Merge (IRFM).

For IRFM, $D_{FIFO}$ is defined as the FIFO depth and $L_d$ as the total number of clock cycles required beginning from the issuance of read requests to a pair of FIFOs to when the output record is ready to be queued in the destination FIFO of next pipeline stage. Additionally, the number of clock cycles to generate the read address, $raddr_i$ of stage i is defined as $L_a$. As $raddr_i$ is dependent on the output record of stage i+1, a minimum of $L_d+L_a$ clock cycles are required for a record to travel from one pipeline stage to the next. Hence, maximum throughput of this multi-way merge implementation, $R^{MAX}$, is 1 element per $L_d+L_a$ cycles as shown in Eq. (1). Henceforth, the duration of $L_d+L_a$ clock cycles will be referred to as a working cycle of period ($T_W$).

To maintain $R_{MAX}$ in a steady state, $D_{FIFO}$ has to be a minimum of 2. The reason is that it takes $T_W$ time to dequeue a record from any FIFO and it takes another $T_W$ time to replenish that FIFO. As a result, for consecutive accesses to any particular FIFO without introducing a bubble, a minimum of two records have to be queued in all FIFOs during initialization. For purposes herein, it is assumed that each FIFO has one read port and one write port independent from each other.

In IRFM, read address generation is trivial as a "not-full" status of any FIFO in stage i+1 can be independently propagated to stage i to generate $raddr_i$. For many practical implementations using register FIFOs $L_d+L_a=1$ and a throughput of 1 element per cycle is achievable using $D_{FIFO}=2$. However, it is assumed that the data stream is not interrupted at the leaf level of the binary tree (i.e. the input stage of the pipeline). Due to various technical reasons, in practical implementations it is common to have occasional interruptions in the data stream at the leaf level of the tree. In such cases, it is beneficial to have $D_{FIFO}>2$ to maintain $R^{MAX}$.

$$R^{MAX} = \frac{1}{L_d + L_a} \text{ records per clock cycle.} \quad (1)$$

Block Memory-Based Multi-Way Merge

Figure 3:
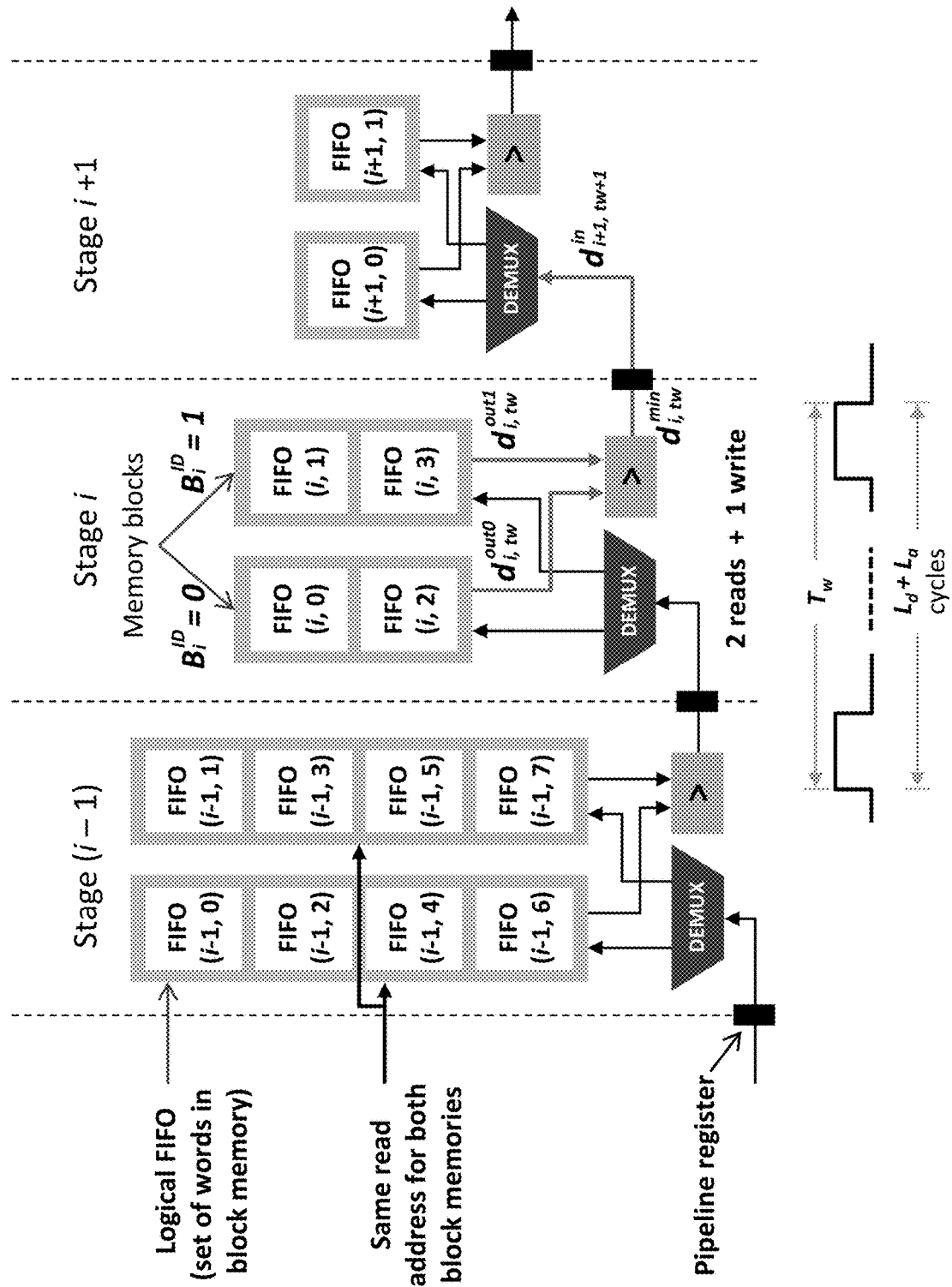
FIG. 3 is a block diagram showing a block memory-based multi-way merge network (Scheme-1).

As k grows, the logic required for the sorter cells and FIFOs grows exponentially. As hardware resources are limited, this becomes one of the key prohibiting factors in implementing a large multi-way merge network. As a solution to this, implementation design as depicted in FIG. 3 can be used. This implementation is referred to herein as "Scheme-1". As it is required to read from two FIFOs simultaneously in every stage, the FIFOs in shown in FIG. 2 are logically mapped to set words in two separate memory blocks. All of the even numbered FIFOs are mapped to a memory block ($B^{ID}=0$) and all of the odd numbered FIFOs are mapped to the other memory block ($B^{ID}=1$). Every FIFO in FIG. 3 works as a sorted list that can be considered as the input data for that particular pipeline stage. Stage i handles $k_i=2^{(S-i+1)}$ such sorted lists, where S is the total number of stages. Among the lists in stage i, the even numbered $k_i/2$ lists are represented by one memory block ($B_i^{ID}=0$) and the odd numbered $k_i/2$ lists are represented by the other memory block ($B_i^{ID}=1$).

In any given working cycle $t_W$, two records, namely $d_{i,tw}^{out0}$ and $d_{i,tw}^{out1}$ are read from the same address of both memory blocks in stage i. However, only the record with the smaller key, $d_{i,tw}^{min}=\min\{d_{i,tw}^{out0}, d_{i,tw}^{out1}\}$, is stored in the pipeline register. This record works as the input data $d_{i+1,tw+1}^{in}$ to stage i+1 in the next working cycle $t_w+1$. Therefore, for every pipeline stage, Scheme-1 requires 2 reads and 1 write in the pertinent memory blocks. It is important to note that the FIFO that dequeued the record with smaller key in stage i at working cycle $t_w$ needs to be replenished at the working cycle $t_w+1$ to maintain steady throughput.

Here, it is assumed that every block memory has one read port and one write port for depiction purpose, which is common for Static Random Access Memory (SRAM). However, this scheme can be generalized, and the fundamental principles do not depend on the number ports of the memory blocks.

One advantage of Scheme-1 is that now only log k sorter cells are required instead of K−1. Secondly, a single SRAM block can be used instead of multiple separate register based FIFOs. This significantly reduces the silicon real estate required for buffer storage needed in a multi-way merge network as SRAM cells (8 transistors) are much smaller than registers (19 transistors). However, as described below, there are a number of potential issues that can render Scheme-1 to be inefficient.

Performance: The block memory in each stage, as depicted in FIG. 3, can be conceptually conceived as a collection of several logical FIFOs sharing a common port for data input and output. Due to this shared port, these logical FIFOs cannot independently enact themselves along the relevant branch of the multi-way merge binary tree. As a result, additional control logic is required. This control logic can potentially become the critical path and reduce throughput by introducing cycle delays (bubbles) in the pipeline.

Scalability: With increasing k, the FIFO buffer requirement grows exponentially for all multi-way merge binary trees. To make it worse, the depth of each logical FIFO in Scheme-1 is required to be increased to partially compensate for the latency and additional control logic delay described above. Therefore, efficient on-chip memory management is imperative to scale multi-way merge network.

Latency: Due to monolithic decoder and SRAM technology, the read and write latency of on-chip block memory is generally much higher than of register based FIFOs. This latency significantly reduces the performance of Scheme-1 based multi-way merge implementations.

Comparison Look Ahead Merge (CLAM)

Disclosed herein is a first embodiment of a multi-way merge implementation scheme, referred to as Comparison Look Ahead Merge (CLAM). CLAM provides better performance (records per cycle) through an efficient address generation scheme and is more scalable due to less demand for buffer storage. Further disclosed herein is a second embodiment of a method, referred to as Hybrid Comparison Look Ahead Merge (HCLAM), to hide the block SRAM latency by pragmatically using both SRAM and registers as merge tree buffers. Both CLAM and HCLAM implementations are novel and no similar methods are found in the prior art.

Before describing the embodiments, the following terminologies are defined for clarity of explanations.

In FIG. 3, FIFO (i,j) sequentially feeds the records from sorted list l(i,j) to its following stages and, as such, l(i,j) can be thought of as the $j^{th}$ input list with respect to stage i, where j=0, . . . , $k_i$. The leaf level FIFOs at $0^{th}$ stage feed the original input data set (K lists) to the entire binary tree.

The frontier record of list l(i,j) is represented as r(i,j). The frontier record of a list is the top most record that hasn't been dequeued from the list yet.

All sorted lists pertaining to any pipeline stage are numbered starting with 0. Comparison between the frontier records of two consecutive lists l(i,j) and l(i,j+1) will always imply that j is an even number. The notation min{r(i,j), r(i,j+1)} indicates the record with the smaller key between the frontier records of two consecutive lists starting with j at stage i. The notation max{r(i,j),r(i,j+1)} indicates the record having the larger key with the rest being the same.

The main idea of CLAM comes from the observation that in any stage of Scheme-1, records are read from the FIFOs and the read address in the next cycle is generated from the comparison results of these records. This sequential dependence of the address on data read in previous cycle is inevitable as this is the fundamental operation of multi-way merge. However, without violating this data dependency, the following operations can be conducted. First, instead of comparing the keys of records when they are dequeued from the FIFOs, the keys can be compared while being queued to the FIFOs. As consecutive lists are compared before they are actually needed, the results of this operation referred to as "comparison look ahead". Second, this comparison information can be stored using a single bit, namely 'tag' (g), and used later to generate an address while the pertinent record is actually dequeued.

These two concepts represent the core of CLAM. The main benefit of CLAM is that it is not necessary to wait for the reading of records from block memory and the comparison to be completed before beginning to generate the address. As the comparison result is already available (i.e., the tag g is pre-computed) the next cycle read address can begin to be generated parallel with the initiation of the read of the current cycle. Therefore, the working cycle duration $T_W$ in CLAM is max($L_a$,$L_d$) unlike the case of Scheme-1 (i.e. $L_a$+$L_d$).

Figure 4:
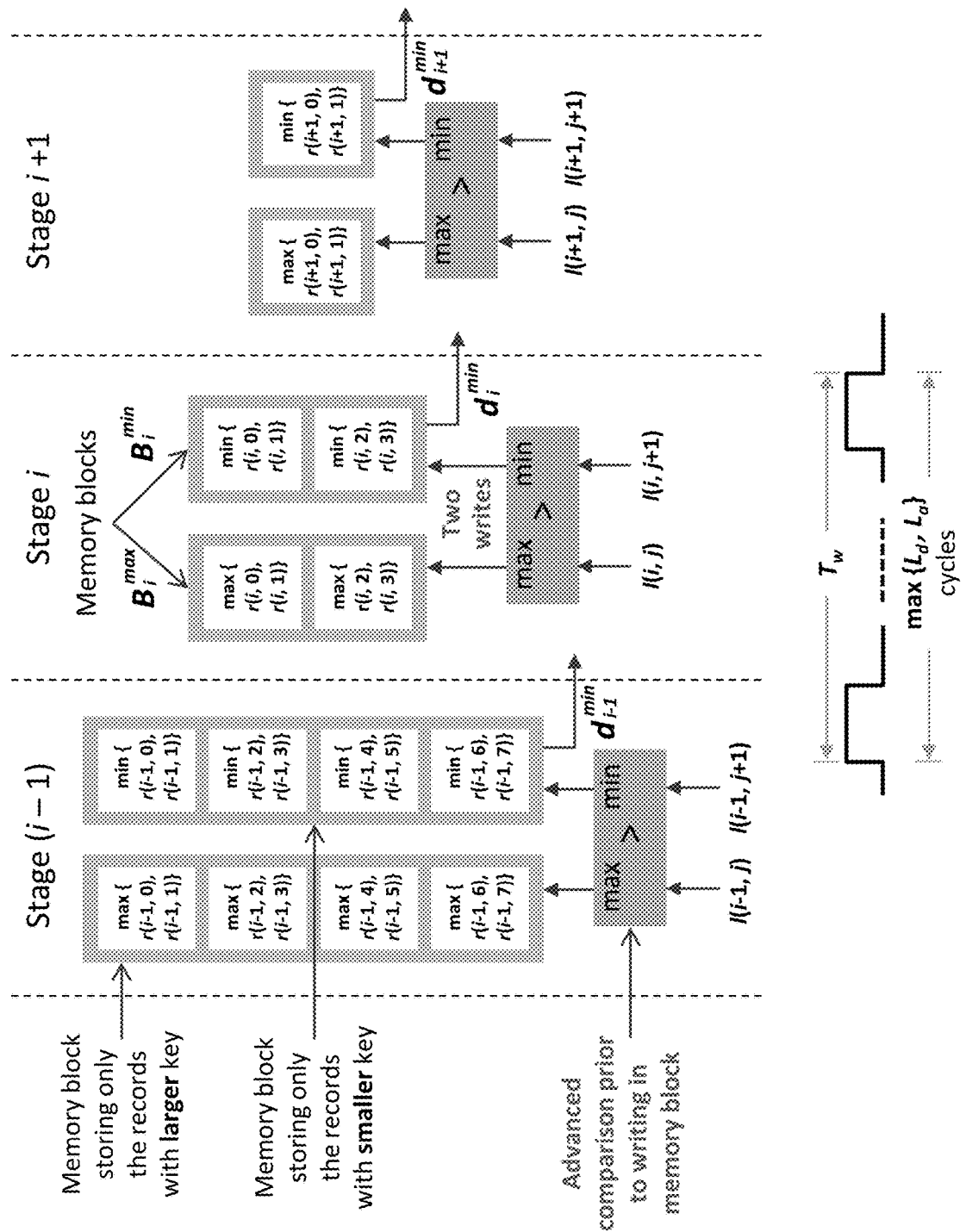
FIG. 4 is a block diagram of advanced comparison based proposed multi-way merge hardware (CLAM).

FIG. 4 is a block diagram of a simplified and conceptual diagram of CLAM that is derived from the implementation of Scheme-1. Instead of directly storing records from the sorted lists, the memory blocks store the output of a comparator. The input to the comparator is the frontier of two consecutive lists. Block $B^{min}$ stores the records with smaller keys and block $B^{max}$ stores the records with larger keys. Therefore, when a record is requested from stage i to stage i+1, it can be directly dequeued from $B^{min}$ without any further comparison.

Figure 5:
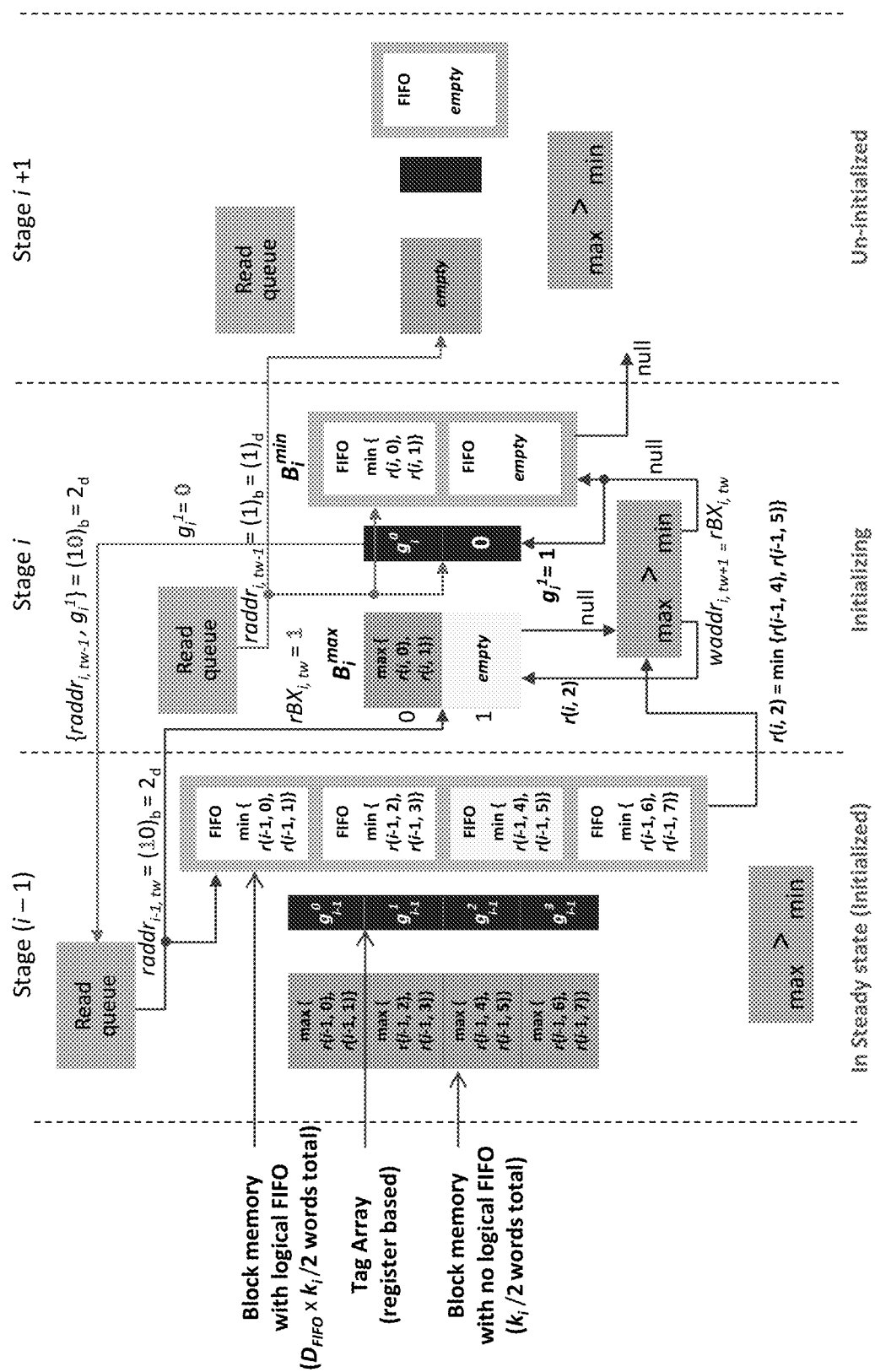
FIG. 5 shows a hardware diagram of CLAM implementation (excluding pipeline registers) and initialization operation at work cycle $t_w-1$ and $t_w$. The solid and dashed paths show active paths during initialization work cycles $t_w-1$ and $t_w$ respectively.

FIG. 5 shows a hardware diagram of CLAM implementation only depicting the connections related to stage i. For better clarity, the pipeline registers are not shown. What follows is an explanation of the important aspects of CLAM implementation and operation in detail.

Data and Address Storage

Figure 6:
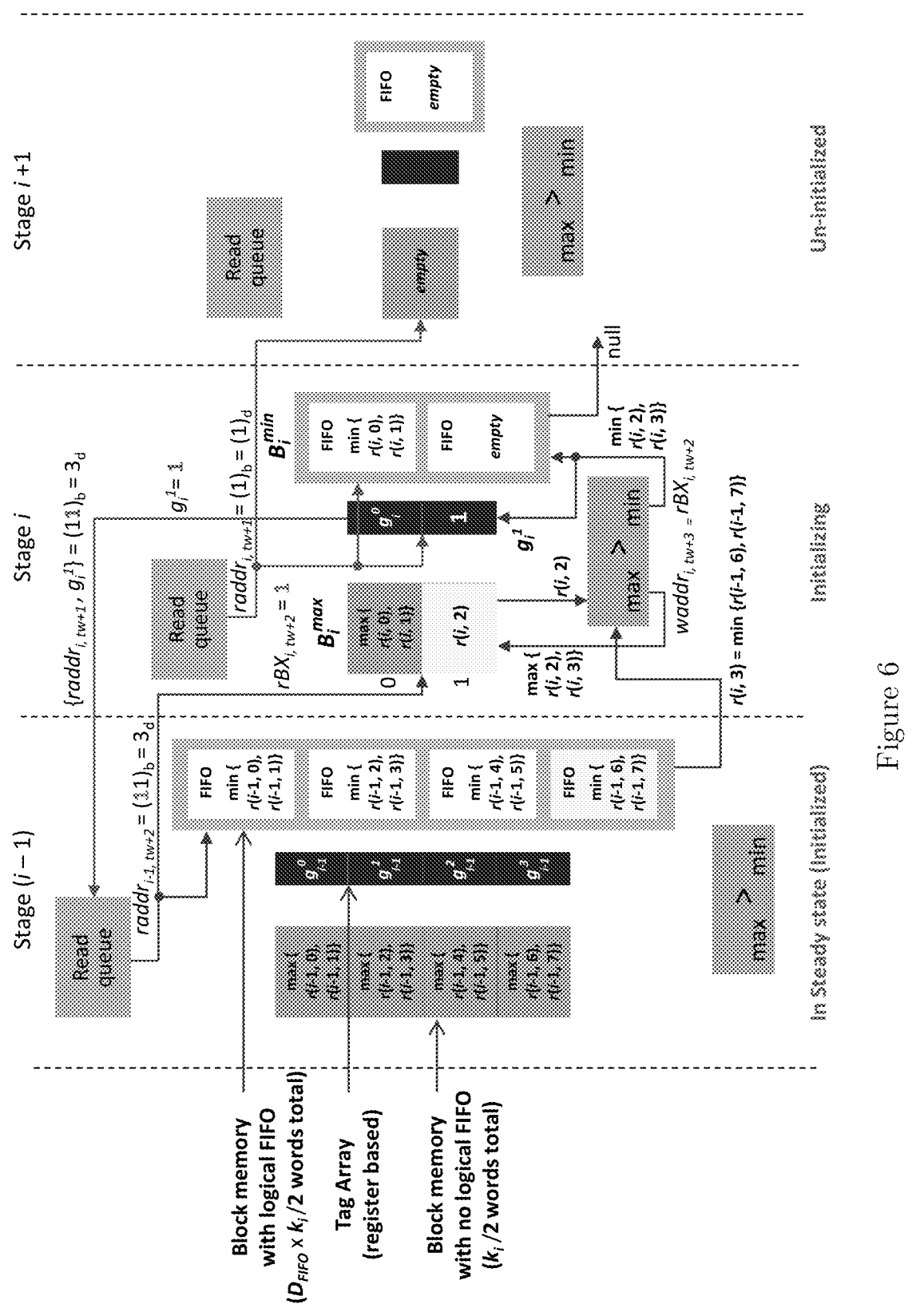

As depicted in FIG. 5 and FIG. 6, the data buffer requirements in CLAM are different than those required for Scheme-1. It is understandable that only one record from $B^{min}$ needs to be transferred to the next stage in a work cycle. As such, to serve consecutive accesses into the same address without introducing a bubble, logical FIFOs in are required. On the other hand, logical FIFOs are not required in $B^{max}$ as its records are not directly transferred to the next stage. A record from $B^{max}$ only takes part in the computation for look ahead comparison when a record is queued in $B^{min}$ in any given work cycle. Therefore, $B^{max}$ has single entry words instead of logical FIFOs. It was mentioned earlier that stage i handles $k_i = 2^{(s-i-1)}$ input sorted lists, where S is the total number of stages. Hence, $B^{min}$ is a memory block with $k_i/2$ logical FIFOs and $B^{max}$ is a memory block with $k_i/2$ words. If the depth of each logical FIFO is $D_{FIFO}$, then $B^{min}$ has in total ($D_{FIFO} \times k_i/2$) words.

Another important difference between CLAM and Scheme-1 is that in every work cycle there are two writes in a stage instead of one. In both CLAM and Scheme-1, one record moves from one pipeline stage to the next in a work cycle. In Scheme-1, the incoming record is queued to one of the memory blocks to replenish one logical FIFO in one of the memory blocks. Similarly, in CLAM, after advanced (look ahead) comparison with the incoming record we need to queue a min{r(i,j),r(i,j+1)} in $B_i^{min}$ to replenish a FIFO. Additionally, it is also necessary to write max{r(i,j),r(i,j+1)} in $B_i^{max}$ to conduct the advanced comparison in the future. Thus, in CLAM there are two reads and two writes of records in every stage at each work cycle.

CLAM also has a read queue to store the read address. This read queue serves the same purpose of storing read request addresses from the following stage and helps to avoid bubbles. A read queue in stage i−1 provides the read address $raddr_{i-1}$ for $B_{i-1}^{min}$ and $B_i^{max}$. $B_i^{max}$ handles half of the number of lists then does and the LSB of $raddr_{i-1}$ is excluded before using it as read address of $B_i^{max}$. Therefore, the read address of $B_i^{max}$ is defined as $rBX_i = raddr_{i-1}$, excluding LSB.

Tag Array

Tag (g) is a single bit that stores the result of advanced (look ahead) comparison. An additional buffer is required in CLAM to store the tags that is named as "Tag Array". Only a single tag bit is required per FIFO of $B^{min}$. Hence, tag array in stage i has $k_i/2$ bits only. As tag array memory requirement is trivial and it can be implemented using registers instead of SRAM for fast access. In every work cycle, one tag bit is updated and utilized to generate address per stage using the following rules.

Tag update rule: Assume $r(i,j)$ and $r(i,j+1)$ are the inputs to the comparator of stage i. If $r(i,j) = \max\{r(i,j), r(i,j+1)\}$, the tag bit $g_i^z$ is updated to '1'. Otherwise, if $r(i,j+1) = \max\{r(i,j), r(i,j+1)\}$, the tag bit gf is updated to '0'. Here $z = j/2$ and j is always an even number in this context. The value of z ranges from 0 to $(k_i/2-1)$.

Tag usage rule: Tag gf is used to generate the LSB of the read request address whenever a $r(i,j)$ is dequeued from the $Z^{th}$ FIFO of $B^{min}$. This request is stored in the read queue of stage (i−1). The entire request address is formed as $\{z, g_i^z\}$, where $z = raddr_i$ is the read address for $B_i^{min}$ at current working cycle.

Initializing Operation

FIG. 5 and FIG. 6 depict three pipeline stages, where stage (i−1) is fully initialized, stage i is being initialized and stage (i+1) is totally un-initialized. Here, only the connections related to stage i are shown for ease of comprehension. In FIG. 5, the blue and black lines are the active paths during initialization work cycles $t_w-1$ and $t_w$ respectively. Similarly, in FIG. 6, the solid and dashed paths show the active paths during initialization work cycles $t_w+1$ $t_w+2$ respectively. The initialization process is now described step by step.

1. At the very beginning all the entries in $B^{max}$ and $B^{min}$ are considered empty. However, all the bits in the tag array are initialized with '0's. FIG. 5 shows the state of all memories at work cycle $t_w-1$.
2. Assume that at a given work cycle $t_w-1$, the read queue in stage i serves as read address $raddr_{i,tw-i}$. Hence, a record from the last FIFO of $B_i^{min}$ is requested. As this FIFO is empty, a null will be delivered. At the same time, the initial value of $g_i^1 = 0$ will be read from the tag array and used to form the read request address for the read queue in previous stage (i−1). The tag bit serves as the LSB and the read address in current work cycle $t_w-1$ serves as the rest. Hence, a read request of address $\{raddr_{i,tx-1}, g_i\} = (10)_b = 2_d$ is sent to the previous stage (i−1) to be logged in its read queue at the end of work cycle $t_w-1$.
3. At the beginning of work cycle $t_w$, read queue of stage (i−1) serves the address $raddr_{i-1,tw} = \{raddr_{i,tw-1}, g_i^1\} = 2_d$. Hence, the record in the $2^{nd}$ FIFO $\min\{r(i-1, 4), r(i-1,5)\}$ is read from $B_{i-1}^{min}$ and passed to the next stage i as the incoming record $r(i,2)$ in work cycle $t_w$. At the same time, $raddr_{i-1,tw}$ (excluding LSB) also works the read address $(rBX_{i,tw})$ for in $t_w$. Hence, a null value from the last entry of $B_i^{max}$ is read.
4. At $t_w$, the comparator in stage i compares $r(i,2)$ with null value. We define $\min\{r(i,2),null\} = null$ and $\max\{r(i,2),null\} = r(i,2)$. Hence, at the end of work cycle $t_w$, $r(i,2)$ is written to $B_i^{max}$ and null value is written to $B_i^{min}$. It should be noted that write address of both $B_i^{max}$ and $B_i^{min}$ in any work cycle is just a delayed version of the read address of $B_i^{max}$ in previous work cycle excluding the LSB. Therefore, write address $waddr_{i,tw-i} = rBX_{i,tw} = raddr_{i-1,tw}$ (excluding LSB) = $1_d$.
5. While data is written in the block memories of stage i, the tag bit at address $waddr_{i,tw+1}$ is also updated. In this case, $waddr_{i,tw+i} = 1_d$. Hence, $g_i^1$ is updated to '1' following the tag bit update rule state above at the beginning of $(t_w+1)$.
6. FIG. 6 shows the state of all memories at work cycle $(t_w+1)$. As the last FIFO in $B_i^{min}$ is still empty, the read queue in stage i will again serve a read address $raddr_{i,tw+1} = 1_d$. Operations as described above in steps 2-5 will repeat for work cycle $(t_w+1)$ and $(t_w+2)$. However, this time the tag bit read at $(t_w+1)$ is $g_i^1 = 1$. Hence, the $3^{rd}$ record from $B_{1-1}^{min}$ and $r(i,2)$ from $B_i^{max}$ is read in $(t_w+2)$. At the beginning of work cycle $(t_w+3)$, $\max\{r(i,2),r(i,3)\}$ is written to $B_i^{max}$ and $\min\{r(i,2),r(i,3)\}$ is written to $B_i^{min}$. The tag bit $g_i^1$ is also updated and, thus, stage i is completely initialized after $(t_w+2)$.

Steady State Operation

Figure 7:
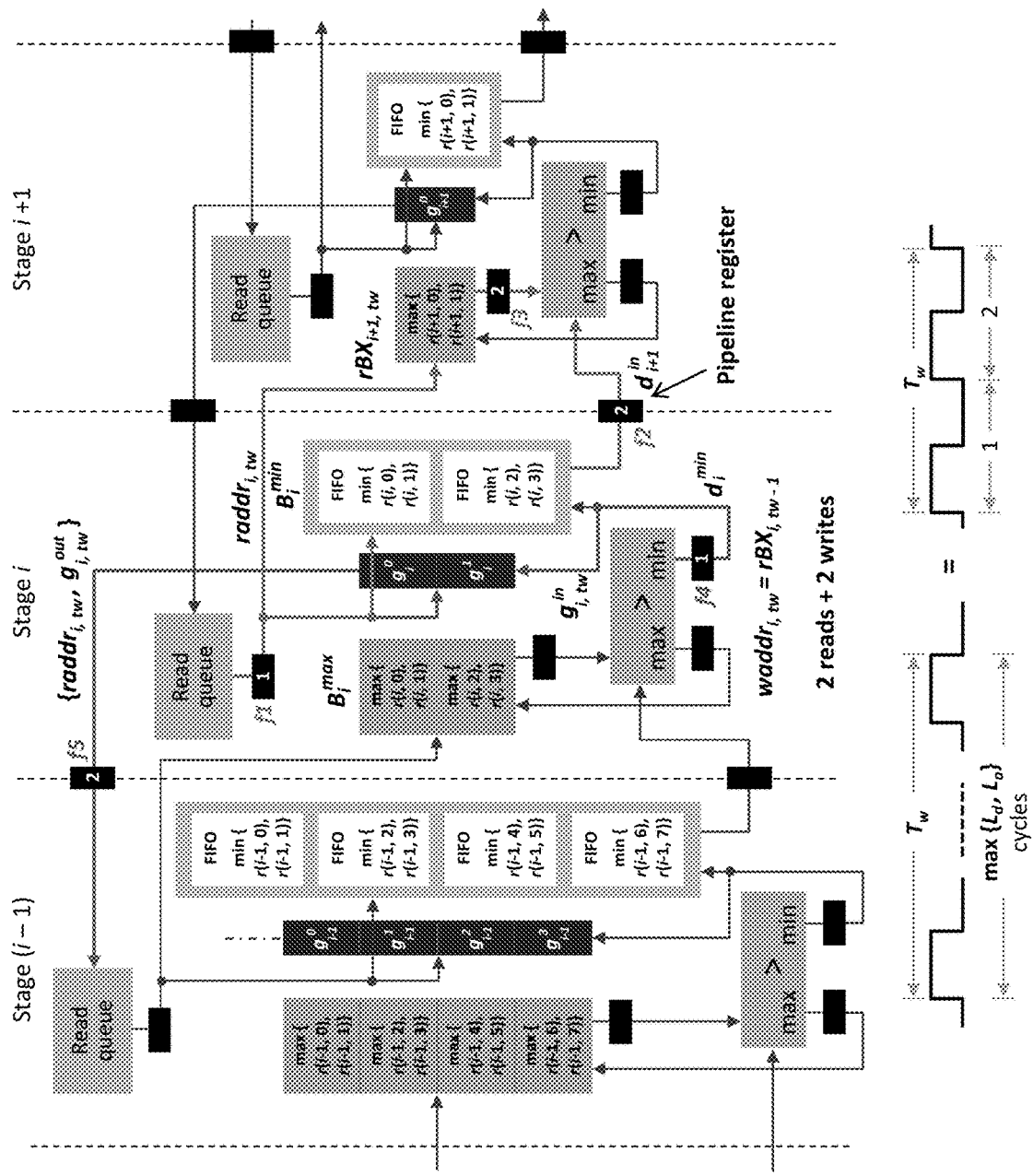
FIG. 7 is a diagram showing CLAM hardware (including all pipeline registers) and steady state read and address generation operations. The solid and dashed paths show the active paths for read and address generation respectively during $t_w$.
Figure 8:
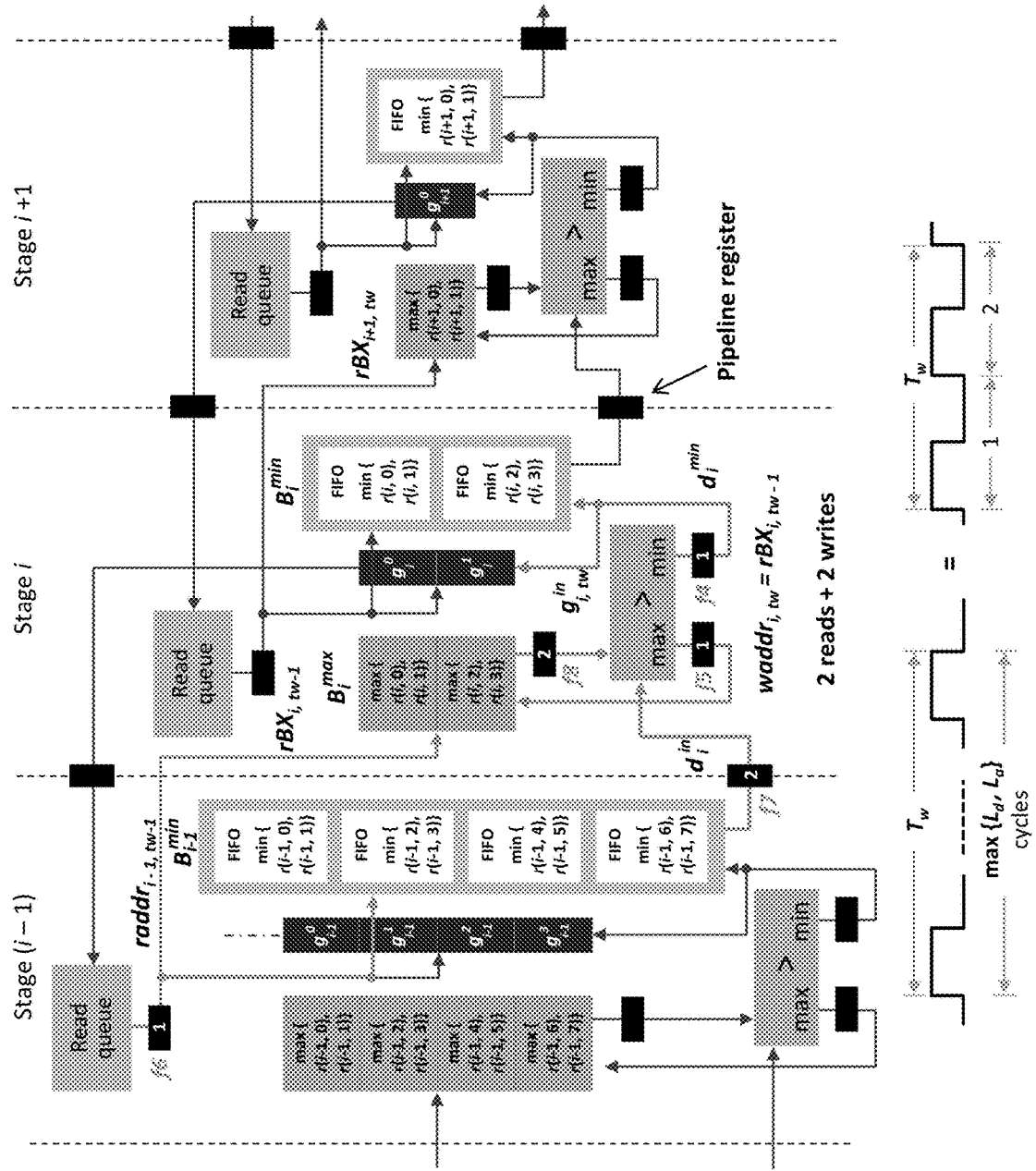
FIG. 8 is a diagram CLAM hardware (including all pipeline registers) and steady state read and write operations. The green and orange paths show the active paths for read at $t_w-1$ and write at $t_w$ respectively.

FIG. 7 and FIG. 8 depict detailed diagram of CLAM operation in steady state including all the pipeline registers and all connections. All the memory buffers and tag array are in steady state. Pipeline registers are used at the same depth that as for Scheme-1 in FIG. 5.

In FIG. 7, the solid and dashed paths show the active connections during data read and address generation respectively at $t_w$. Registers f1, f2 and f3 participate in the data read process and f4 and f5 participate in the address generation process. The numbers mentioned in the registers represent the clock cycle within a work cycle that triggers them (at rising edge). At the rising edge of clock cycle 1, f1 latches the read address $raddr_i, t_w$ from the read queue. Hence, $B_i^{min}$ and $B_{i+1}^{max}$ is read during clock cycle 1. At the rising edge of clock cycle 2, f2 and f3 latch these read data and advanced comparison of the keys are conducted during this clock cycle. Thus, for data read and look ahead comparison the number of required clock cycles $L_d$ is 2.

During clock cycle 1 $raddr_i,t_w$ is also used to read the previously computed comparison result $g_{i,tw}^{out}$ from the tag array. At the rising edge of clock cycle 1 f4 also latches advanced comparison result $g_{i,tw}^{in}$ that is latched into the tag array at the rising edge clock cycle 2 at address $waddr_{i,tw} = rBX_{i,tw-1}$. During clock cycle 1, if $raddr_i,t_w$ happens to be the same as $waddr_i,t_w$ then $g_{i,tw}^{in}$ is used as $g_{i,tw}^{out}$ instead of what is actually read from the tag array. This is because the tag value pertaining to the latest record queued to the FIFOs in $B_i^{min}$ must be used for the read request address generation. In any case, at the rising edge of clock cycle 2, request address $\{raddr_{i,tw},g_{i,tw}^{out}\}$ is stored in the read queue of stage (i−1) through register f5. Hence, the overall address generation process also takes 2 clock cycles, i.e. $L_a = 2$.

For efficient implementation of CLAM, data write must be overlapped with read or address generation and finished within $\min\{L_d,L_a\}$ clock cycles so that no extra time is spent for write. In FIG. 8, the active paths during data write are depicted at $t_w$, (solid paths) besides the ones during data read at $t_w-1$ (dashed paths). In fact, the data write process only takes one cycle as the write address generation is trivial and already available from the data read operation in work cycle $t_w-1$. At the rising edge of clock cycle 1 in $t_w-1$, $raddr_{i-1,tw-1}$ is latched by f6. This address is used to read records from and $B_{i-1}^{min}$ and $B_i^{max}$, which are latched by f7 and f8 at the rising edge of clock cycle 2 in $t_w-1$. Hence, at the rising edge of clock cycle 1 in $t_w$ both the output records after comparison is latched by f5 and f4. These stored records at f5 and f4 are written to $B_i^{max}$ and $B_i^{min}$ memory blocks during the first clock cycle of $t_w$, which is overlapped with the data read from these memory blocks. For both $B_i^{max}$ and $B_i^{min}$ write address is $waddr_{i,tw} = rBx_{i,tw-1}$ which is available from the previous work cycle $t_w-1$.

CLAM Performance: Because the data read and address generation is parallelly conducted in CLAM, duration of a work cycle $T_w$ can be derived by $\max\{L_d, L_a\}$. As both $L_d$ and $L_a$ are 2, the duration of $T_w$ is also 2 cycles. Unlike in Eq(1), the maximum throughput of CLAM can be calculated as Eq(2). Due to the overlap of data read and address generation $R_{CLAM}^{max}$ is two times faster than $R_{Scheme-1}^{max}$, which is the highest throughput possible by block memory-based multi-way merge implementations.

$$R_{CLAM}^{max} = \frac{1}{\max\{L_a, L_d,\}} = \frac{1}{2} \text{ records per clock cycle} \quad (2)$$

CLAM Scalability: Scarcity in fast on-chip memory is one of main reasons that multi-way merge implementations cannot scale. We have seen that in Scheme-1, both the memory blocks in a pipeline stage comprise of logical FIFOs. However, in CLAM, only one of the memory blocks comprise logical FIFOs. Hence, if the FIFO depth increases only by 50% of the memories in CLAM increase, whereas in Scheme-1b 100% of the memories increase in size. Furthermore, as CLAM work cycle is half of the work cycle for Scheme-1, relatively less FIFO depth is required in CLAM to avoid bubbles. The additional resources that CLAM needs is the storage for tag array. However, only single bit per logical FIFO is required, which is trivial.

Hybrid CLAM (HCLAM)

One of the main drawbacks of using SRAM blocks instead of registers for multi-way merge tree is that SRAM read latency is significantly larger. CLAM utilized a deeply pipelined design to improve clock frequency. However, the clock period is bounded by the SRAM block read latency. Furthermore, the throughput of deeply pipelined CLAM's is one element in two cycles, whereas register FIFO based merge can provide a throughput of one element per cycle. Hybrid CLAM is a pragmatic way of utilizing both SRAM and register based implementation.

Figure 9:
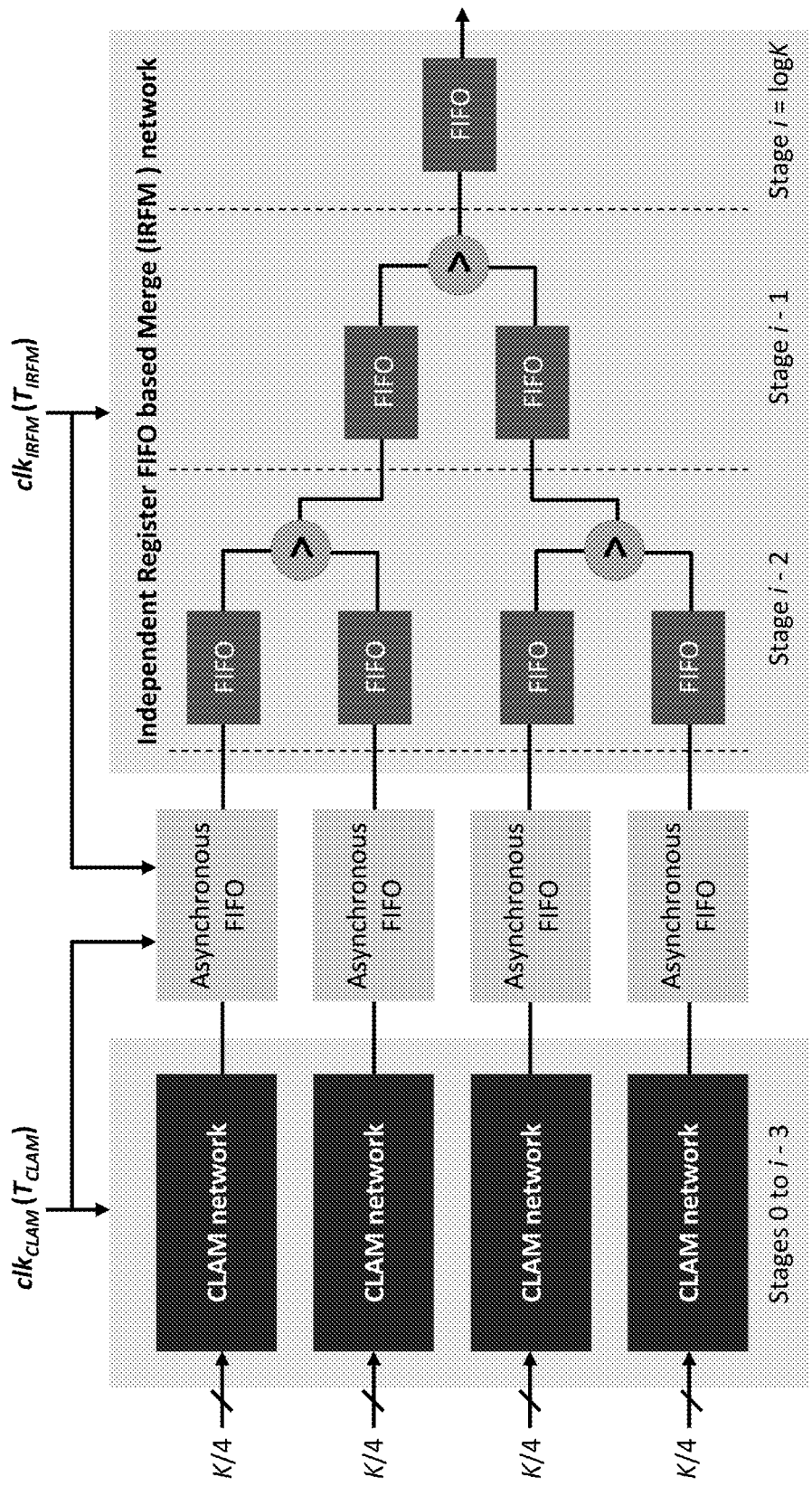
FIG. 9 is a block diagram of a hybrid CLAM (HCLAM) embodiment of the invention.

FIG. 9 elaborates the hardware implementation of HCLAM. Here, the large, in terms of memory usage, stages of the multi-way merge network are implemented using SRAM memory based CLAM. The last few stages, i.e. those close to the final output, are implemented using independent register FIFO based merge tree (i.e. IRFM, as shown in FIG. 2). This is a hybrid implementation because of the mix between two different types of multi-way merge schemes. Previously, IRFM was discarded as a scalable multi-way merge network because it is not feasible to implement for large values of K due its high resource requirement of memory and logic. However, the last few stages of IRFM require only a trivial number of buffers and sorter cells. As such, for any multi-way merge binary tree implementing the last few (e.g. 3 or 4) stages using IRFM doesn't have any considerable effect on the scalability of overall implementation. However, integrating these few stages with the CLAM network as shown in FIG. 9 helps to hide the SRAM latency of CLAM. The idea is that multiple CLAM networks will queue their output records in multiple asynchronous FIFOs at their peak throughput. At the same time, these asynchronous FIFOs will work as the input lists for a small IRFM network that has higher throughput. If the absolute rates of input and output of these asynchronous FIFOs are matched, then the overall HCLAM implementation will achieve the higher throughput of IRFM, while having the better scalability of CLAM.

The two different multi-way merge schemes in HCLAM are implemented using two independent clocks as shown in FIG. 9. The clock periods of $clk_{CLAM}$ and $clk_{IRFM}$ are defined as $T_{CLAM}$ and $T_{IRFM}$. In practical implementations, $clk_{CLAM}$ is slower than $clk_{IRFM}$ as the SRAM read latency falls in the critical path of CLAM, (i.e. $T_{CLAM} > T_{IRFM}$). Furthermore, the maximum throughput of CLAM $R_{CLAM}^{max}$ is $\frac{1}{2}T_{CLAM}$, which is less than the maximum throughput of the register FIFO based merge $R_{IRFM}^{max} = 1/T_{IRFM}$. The goal of HCLAM is to provide the same throughput as $R_{IRFM}^{max}$ for the entire multi-way merge network. It is easily achievable by integrating multiple CLAM networks with an IRFM network at the proper ratio ($Ratio_{HCLAM}$). Eq (3) provides a formula to calculate this ratio.

$$Ratio_{HCLAM} = \frac{R_{IRFM}^{max}}{R_{CLAM}^{max}} = \frac{2T_{CLAM}}{T_{IRFM}} \quad (3)$$

For an ASIC implementation $clk_{IRFM}$ is almost twice as fast as $clk_{CLAM}$. In that case, $Ratio_{HCLAM}$ is 4 as computed by Eq(3). Furthermore, the number of stages required for IRFM can be calculated as $\log_2(Ratio_{HCLAM})+1=3$.

It is also important to have enough depth in the $Ratio_{HCLAM}$ number of asynchronous FIFOs that interfaces the two different networks. If the data set is not heavily skewed towards any particular set of input lists, a FIFO depth of 8 to 32 works reasonably well. Even if data is heavily skewed, the depth can be increased without considerably affecting overall scalability as $Ratio_{HCLAM}$ is expected to be small (on the order of 2 to 8).

Parallel Multi-Way Merge

Even though HCLAM itself increases the performance of a single multi-way merge network by almost 3 times, it still not enough to saturate the system streaming bandwidth properly. Therefore, a parallel implementation of the merge network that can output multiple records to match the available streaming bandwidth is needed. A scalable parallelization method that can effectively address technology scaling is disclosed and referred to herein as Parallelization by Radix Pre-sorter (PRaP).

Parallelization by Radix Pre-Sorter (PRaP)

Figure 10:
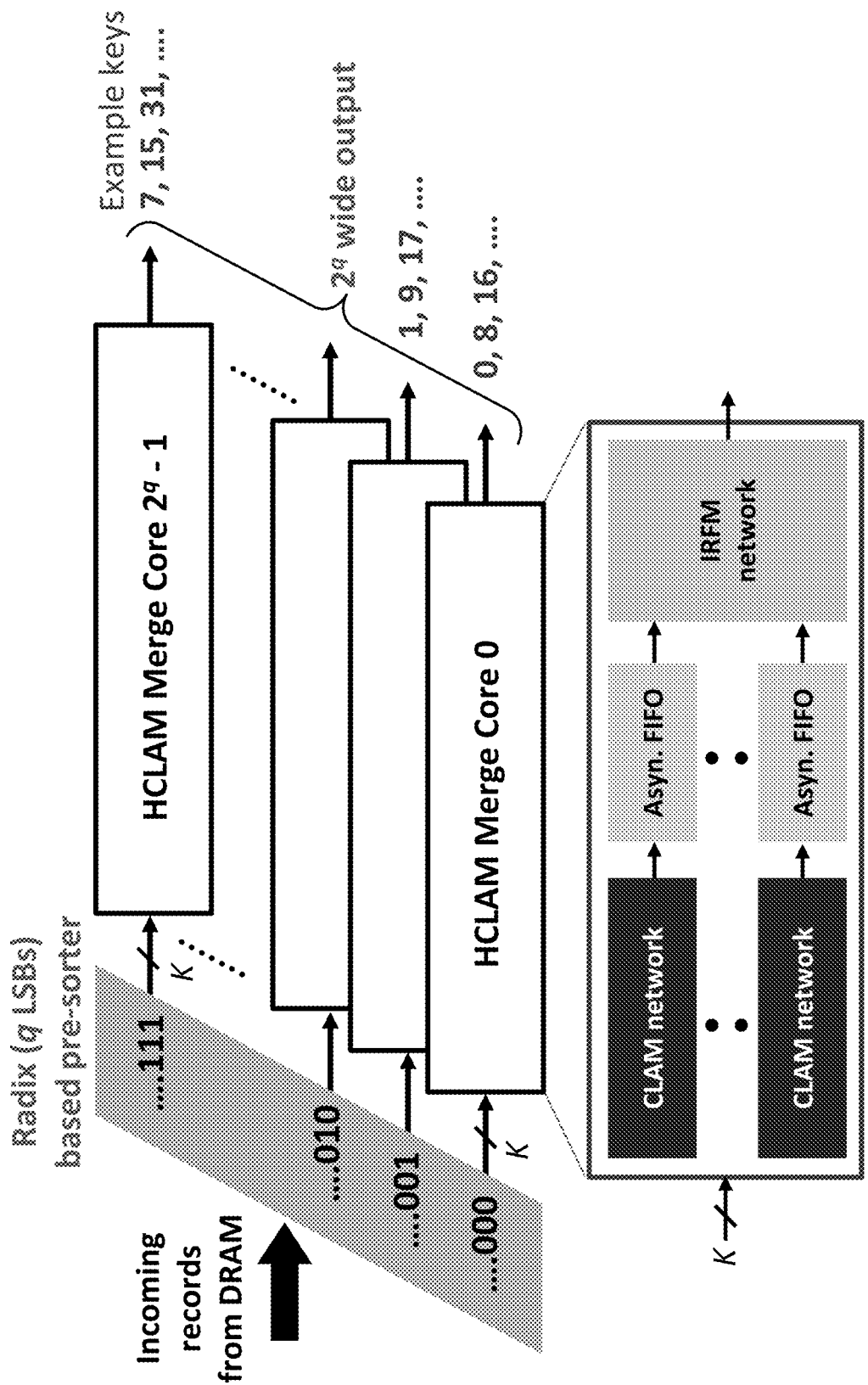
FIG. 10 shows a diagram of Wide output Multi-way Merge implementation using scalable Parallelization by Radix Pre-sorter (PRaP) and multiple parallel HCLAM cores.

From the discussion above it is apparent that a parallelization scheme is need that doesn't require increasing prefetch buffer with more parallel multi-way merge networks. PRaP is a solution to this problem, which is depicted in FIG. 10. The idea is to implement p independent multi-way merge networks where each will only work on records with certain radix within the keys. For that purpose, each record streamed from DRAM is passed through a radix based pre-sorter and directed to its destination merge network. Each such merge network is denoted as a Merge Core (MC) that is implemented using HCLAM. q is defined as the number of LSBs from the key of a record that is used as the radix for pre-sorting as shown in FIG. 11. The number of MCs is $p=2^q$ and, thus, a multi-way merge network with total output width of p records can be achieved. The main benefit of PRaP is that, irrespective of p, the on-chip prefetch buffer size is $Kd^{page}$, which is only 2 MB given the example in previous section. Because p can be incremented without requiring more on-chip storage, PRaP is significantly scalable and effective in addressing technology scaling. It is important to note that PRaP method of parallelization only works when it is guaranteed that the sorted output list is a dense vector, as in the case for output vector y in SpMV.

Radix Pre-Sorter Implementation

Figure 12:
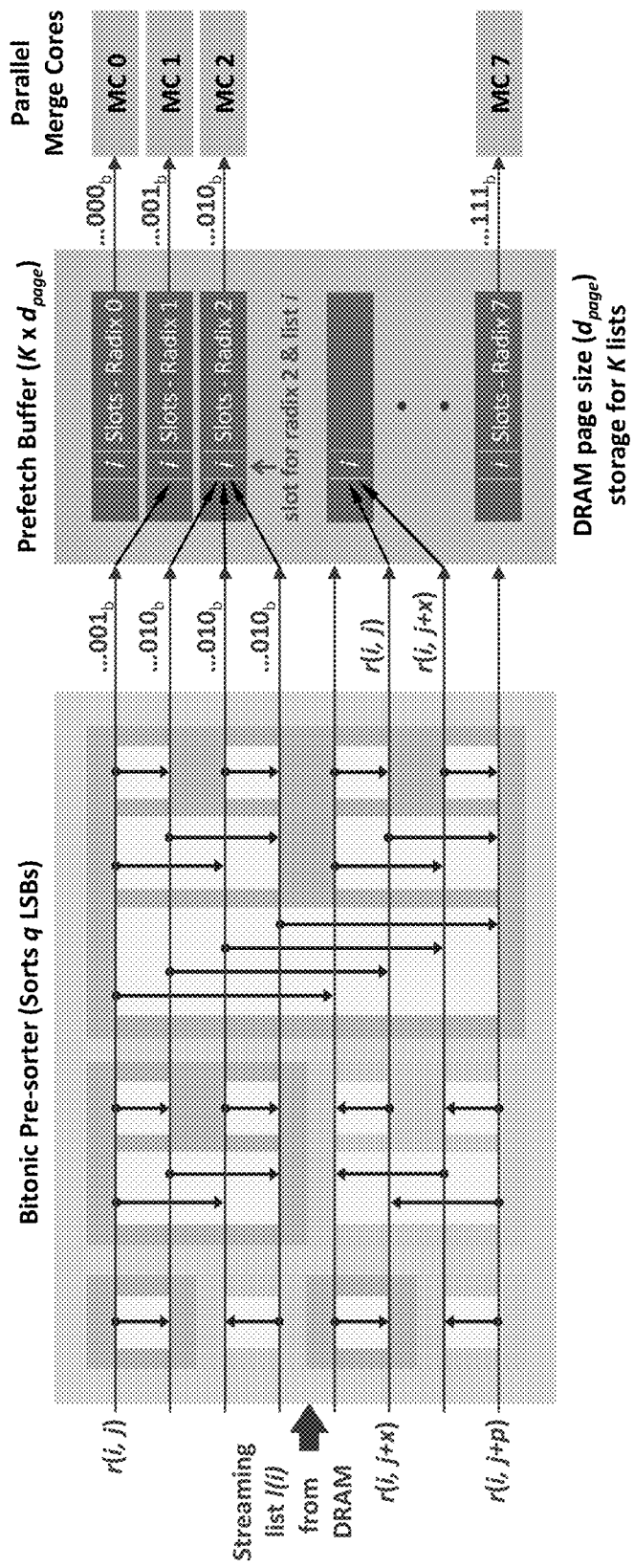
FIG. 12 shows a radix pre-sorter implementation using Bitonic sorter and prefetch buffer, that assumes $r(i,j)$ and $r(i,j+x)$ have the same radix.

Without any loss of generality, assume that the DRAM interface width is also p records. Whenever the $i^{th}$ list l(i) is streamed from DRAM, records r(i,j) to r(i,j+1) is transferred in a single clock cycle as a part of the prefetched data. These p records are then passed through pipelined radix based pre-sorter as shown in FIG. 12. The pre-sorter is implemented using a Bitonic sorting network as p output per cycle is required to match the input rate. FIG. 12 depicts the Bitonic network in simplistic manner. The horizontal lines show the data path of the record. The downward and upward arrows represent comparison and swap operation in the ascending and descending order respectively. It is important to note that only q bits of the keys take part in the comparison operation of the pre-sorter. The logic resource requirement of PRaP pre-sorter is significantly less than what is required for a one with full key comparison.

During the pre-sort, it is mandatory to maintain the original sequence of the records that possess the same radix. For example, as shown in FIG. 12, if r(i,j) and r(i,j+x) and both have the same radix bits then r(i,j) should precede r (i,j+x). This is imperative because for any given merge core the input records of any list must be sorted with respect to the rest of the bits other than the radix within key. After pre-sorting, the outputs are stored in the prefetch buffer at the allocated location for list $l_i$. The prefetch buffer allocates $d_{page}$ size storage for each list. Internally within the buffer for each list, the radix sorted records are kept in separate slots for the ease of feeding to the appropriate MC. For example, if the radix of record r(i,j), ead(i,j) is $100_b$ then record r(i,j) is stored in the page buffer only for consumption of MC4.

Load Balancing and Synchronization

Figure 13:
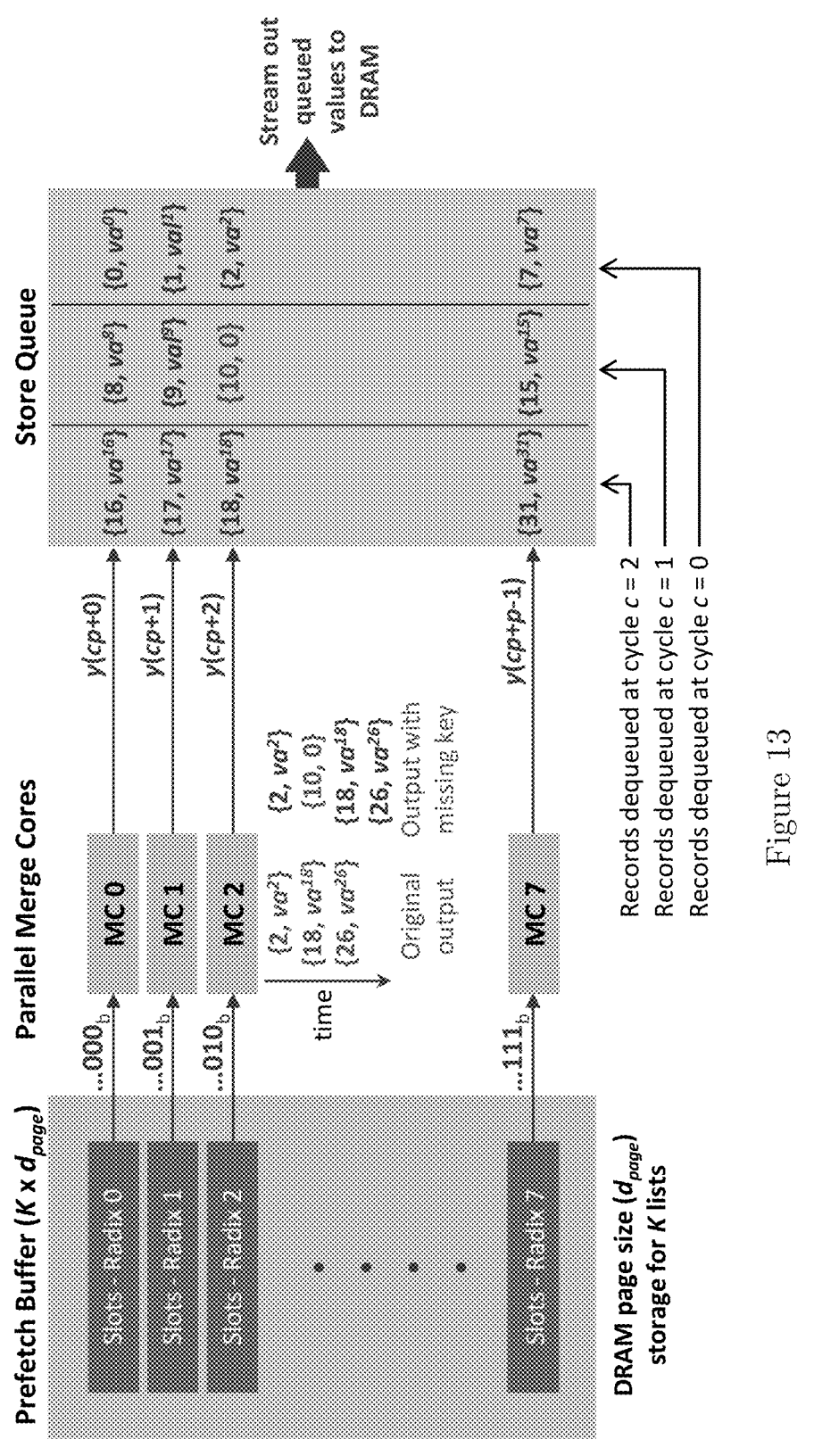

It is possible for the incoming lists to have keys that are imbalanced in terms of the radices. In such case, the data are unevenly distributed among the MCs and potential load imbalance will occur. More importantly, as the independent MCs work only on a particular radix, further sorting and synchronization among the output of cores should have been required to generate a single sorted final output. Both of these issues can be effectively resolved from the observation that the final output list is a dense vector. It is guaranteed that each MC will sequentially deliver records with monotonously increasing keys (assuming sort in ascending order). Additionally, is also mandatory that each possible key, which is the row index of the sparse intermediate vector in Two-Step SpMV, is present in the resultant dense vector. For example, as shown in FIG. 13, assume that the input data set with radix $(010)_b=2$ doesn't have any record with key 10. For that reason, the MC2 sequentially delivers records $\{2,va^2\}$ (key 2 and value $va^2$) and $\{18,va^{18}\}$. As a result, an expected record with key 10 is missing at the output stream of MC2. To handle this scenario, missing key check logic is included in the MC design. Whenever a missing key is detected at the output, that key is artificially injected in between the original outputs along with a value of '0' and the following records are delayed. Thus, for the given example, an artificial record $\{10,0\}$ is injected after $\{2,va^2\}$ and $\{18,va^{18}\}$ and $\{26,va^{26}\}$ are delayed.

The insertion of missing keys, necessitated by the dense output vector, solves both the load imbalance and synchronization problem. First, even though data are unevenly distributed among the cores, at the output each MC produces same number of records at similar rate. The effect of load imbalance is practically hidden even if it occurs. Second, output from the p cores, y(cp+0) to y(cp+p−1), can be independently queued in a store queue and synchronously streamed out (dequeued) to DRAM. The records y(cp+0) to y(cp+p 1) are consecutive elements of the dense output vector. Furthermore, records dequeued at cycle c and (c+1) are also consecutive segments of the dense vector. Thus, more sorting logic to synchronize the outputs is not required from p independent multi-way merge cores. Therefore, in the parallelization method PRaP the design can be scaled to multiple cores without increasing on-chip buffer requirements and will achieve the required throughput to match the streaming main memory bandwidth. Only q=4 bit radix pre-sorting (i.e., $2^4=16$) cores, is enough to saturate the extreme HBM bandwidth that is in the order of hundreds of GBs.

Up to this point, a scalable multi-way merge merge scheme that can effectively and practically handle large problem size (thousands of lists) at extremely high throughput (hundreds of GBs or several TBs) has been disclosed. The entire method can be termed as HCLAM with PRaP parallelization. HCLAM mainly handles problem scaling and PRaP parallelization handles technology scaling. The method is scalable because it doesn't prohibitively require more on-chip memory or logic as the problem size grows. Because of PRaP, the throughput can also be increased by incrementing the number of merge cores without increasing on-chip memory, which is the most critical resource for scaling.

Reductions for High Performance Merge Operation

Reductions (i.e. accumulating values for more than one record if their indices match) are very common and an integral operation in many multi-way merge implementations. Reductions also need to be done at full throughput to match the performance of high throughput merge. However, latency in floating point adders create challenge in maintaining full throughput during reductions. There are various scenarios where full throughput reductions are necessary.

Figure 14:
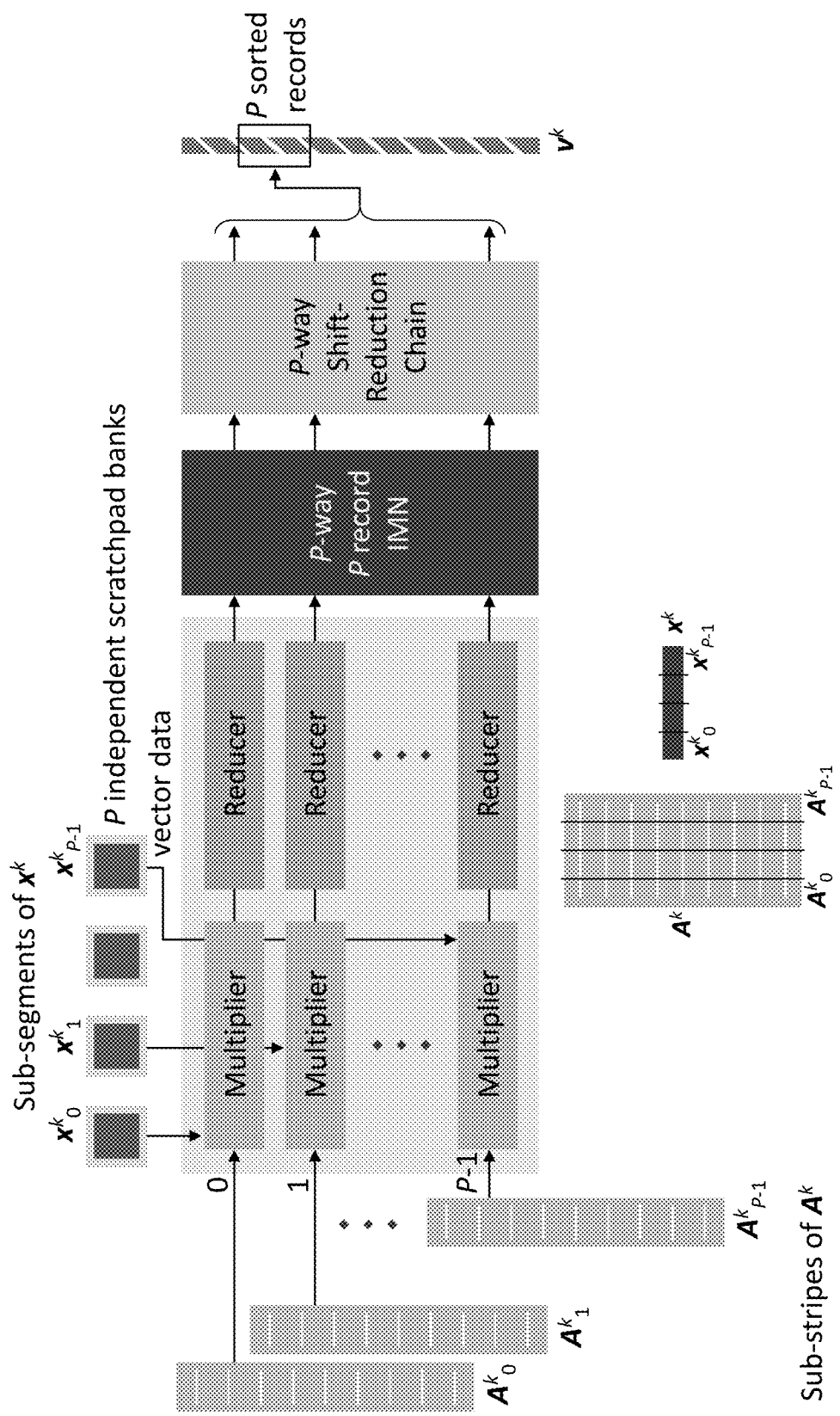
FIG. 14 is a diagram showing a partial SpMV unit (PSU) to conduct step 1 of a two-step algorithm using IMN and independent scratchpad bank access.
Figure 15:
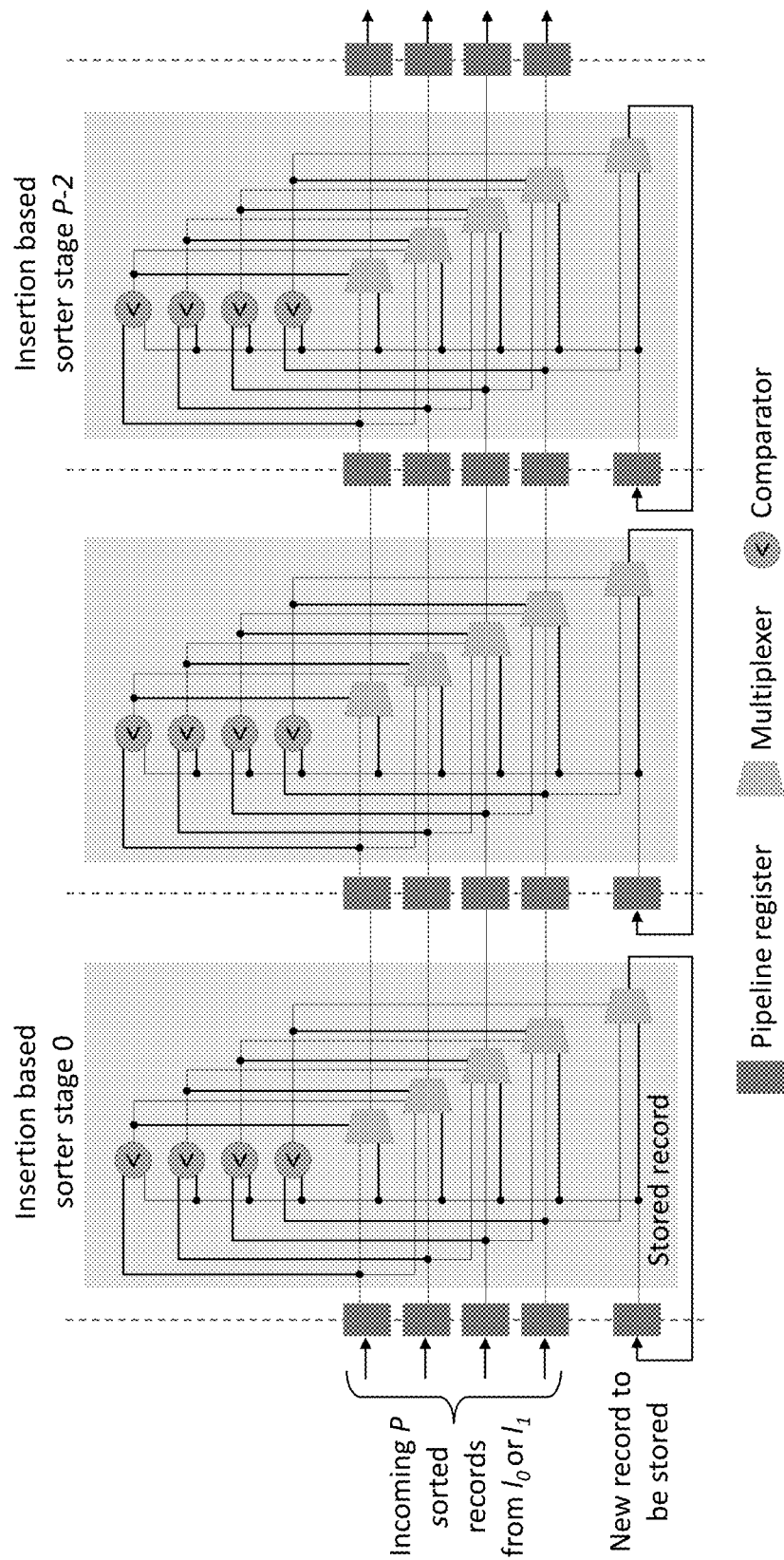
FIG. 15 shows insertion-based merge network (IMN) sorting stages.

For example, for the SpMV operation, P sets of floating point (FP) multiplier and adder chains parallelly work on separate sub-stripes of $A^K$ and sub-segments of $x^k$, as shown in FIG. 14. Thus, P sorted lists are generated at the output of P multipliers. Every sorted list needs to be reduced at full throughput by a reducer. Moreover, at the end of reducing P sorted lists independently, they need to be merged them into one final vector $v^K$ (resultant sorted list). For this merge operation, an Insertion based Merge Network (IMN), as depicted in FIG. 15, may be used.

Figure 16:
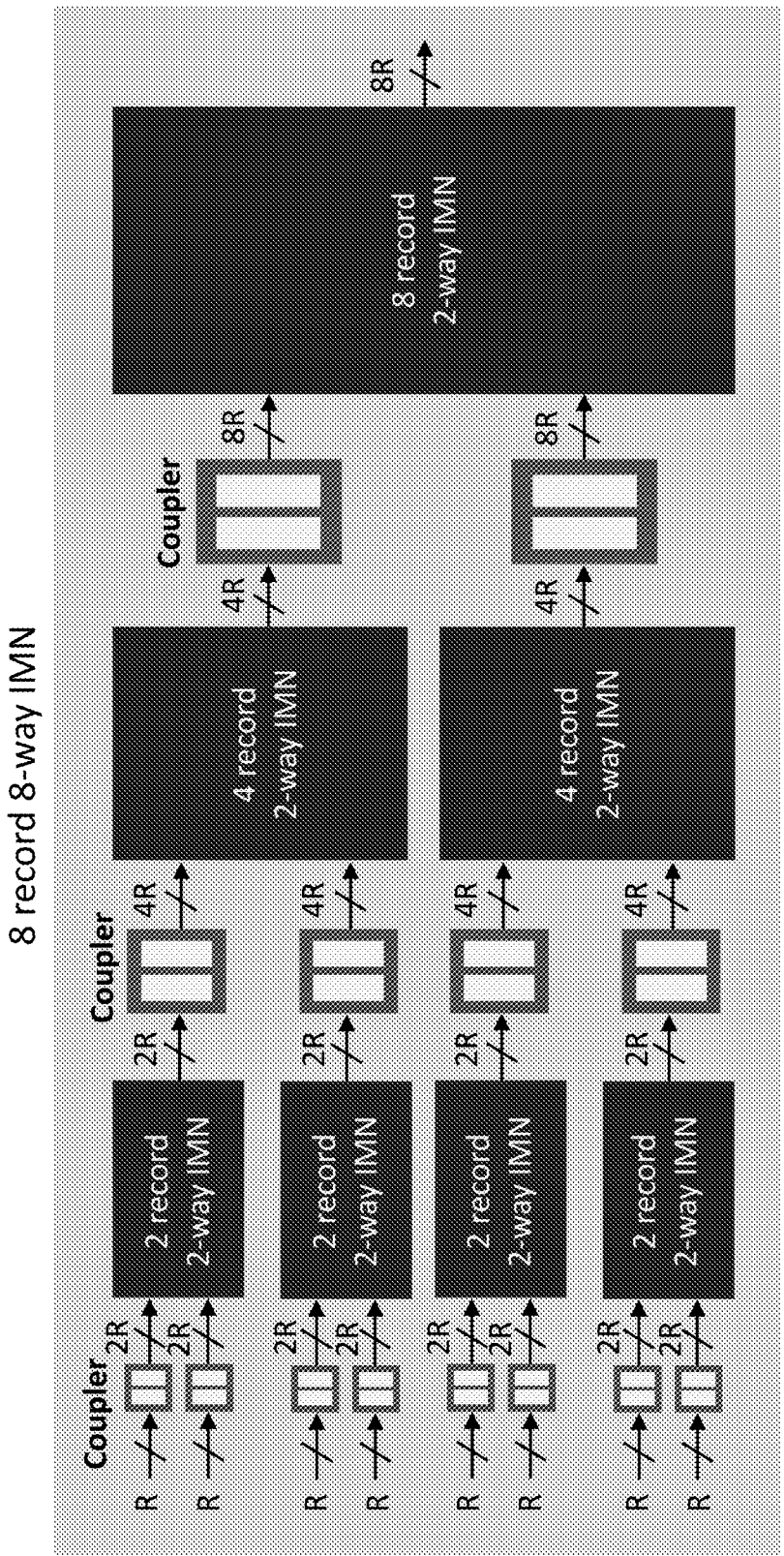
FIG. 16 is a diagram showing the construction of a P record P-way IMN from smaller 2-way IMNs.

A P-way IMN is capable of delivering P records (i.e. key-value pairs) per cycle. As shown in FIG. 15, the main idea of sorting by insertion is to compare keys of P sorted incoming records from a list parallelly with another key of a previously stored record in a single sorter pipeline stage. This stored record is inserted in the appropriate position among the incoming records and a new set of (P+1) sorted records is constructed. The last among these (P+1) records replaces the stored record in the following cycle. Such (P−1) sorter stages can be pipelined to construct a P record 2-way IMN. At the first stage, P incoming sorted records are sourced from one of two input lists and $l_0$ and $l_1$. The top records of $l_0$ and $l_1$ are compared and the list with the smaller key (assuming ascending order) delivers the P sorted incoming records for the IMN at any given cycle. All stored records at each pipeline stage are initialized with zero. FIG. 16 depicts how several smaller 2-way IMNs can be connected together to build a larger IMN with more ways. The coupler consists of FIFOs and simply appends stream of records to double the stream width. IMN is not easily scalable due to high resource usage as P increments. However, for the purpose of PSU, with small P it is possible to maintain high throughput to utilize 3D DRAM streaming bandwidth.

IMN-based schemes are preferred for PSU rather than the shared scratchpad-based one as it provides more computational efficiency with same level of hardware complexity.

Full-Throughput Reducer

Figure 17:
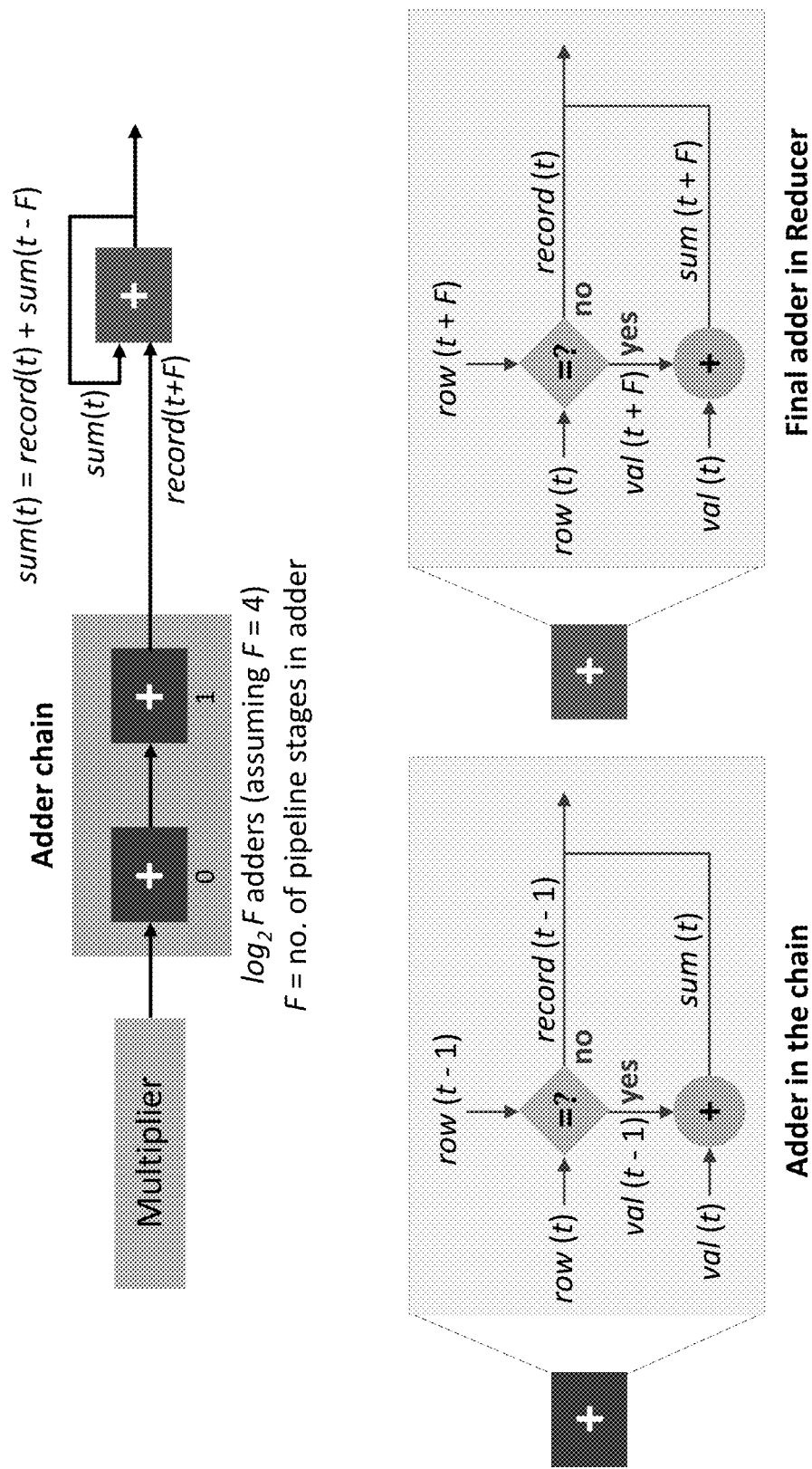
FIG. 17 is a diagram showing a full-throughput reducer design that avoids stalls due to internal pipelines in the adder.

One of the important aspects of the above computation is the reducer. Accumulation or reduction is required for collisions (i.e. when row-indices of two consecutive records match). However, a pipelined adder cannot handle more than one collision without introducing stalls in the entire computational pipeline. These stalls are due to internal pipelines of the adder. F is denoted as the number of internal pipelines of an adder. An entire addition, which takes F cycles, has to be completed before start resolving the next if another collision is found for the same row index. To overcome this, a chain of $\log_2 F$ adders can be used, along with another final adder, as shown in FIG. 17, that can resolve all collisions for any given row index without introducing any stalls. This entire scheme ensures full throughput during merge and consecutive reduction operation. The internal logic of each type of adder is also elaborated in FIG. 17. An adder intakes one record per cycle and compares the row index (row) of the current record, record(t), with the row of record(t−1). Here t represents the sequence of records as they appear at the input of the adder. If row(t) and row(t−1) match, the values are added and a new record, sum(t), is delivered that has a key row(t) and a value val(t)+val(t−1). If no collision is found, record(t−1) is delivered and record(t) is temporarily stored to check collision with record(t+1). In the case of the final adder in the reducer, there will be F cycles delay between two consecutive records. The result sum is ready for the feedback path to be accumulated with the incoming record in case the indices match. Here, sum(t) represents the accumulated result for all the collisions comprising record (t). When no more collisions are found between the incoming record and sum, the output is then released from the Reducer.

Full Throughput Shift-Reduction Chain

Figure 18:
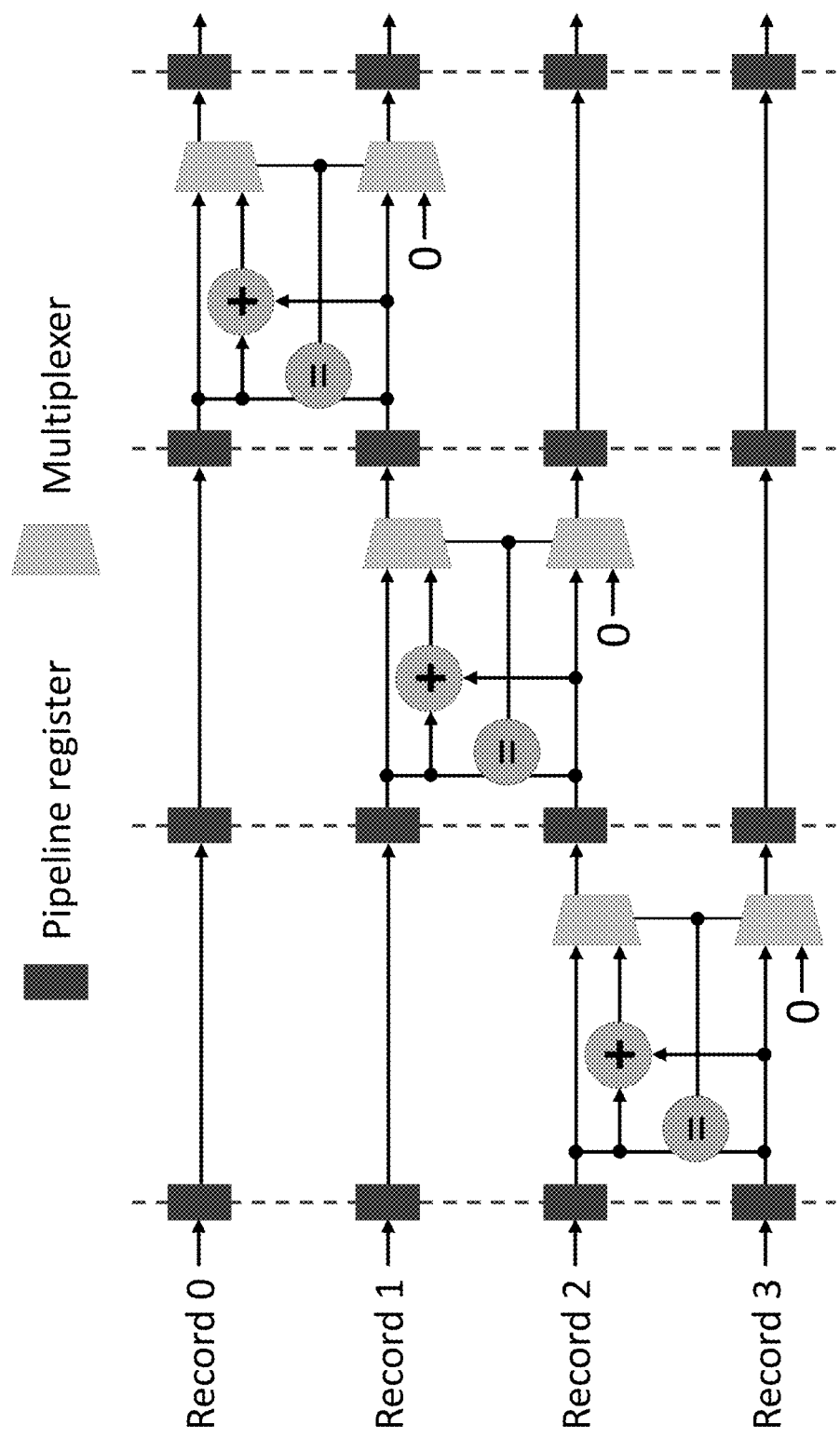
FIG. 18 is a diagram showing a shift-reduction chain to handle collisions among sub-stripes. Illustrated is a 4-way shift-reduction chain.

While the Reducer resolves all collisions within a sub-stripe of the matrix, there can still be collisions among the P sub-stripes. Therefore, the sorted outputs are required to be checked for collisions and resolved when needed. To achieve this in a pipelined manner, a P-way shift-reduction chain maybe used as depicted in FIG. 18. The main idea is to sequentially check two neighboring records for collision. This process starts from one end of the sorted outputs of the IMN. If starting from bottom, when the indices of the records match the upper output stream delivers the accumulated result and the lower output stream delivers an artificial 0 (or null) value. When this process continues to the next pipeline stage of the chain, the next two recorded are checked for collision as shown in FIG. 18. This process is referred to as shift-reduction, as in every stage of the chain selection of the records shifts by one. Thus, at the end of shift-reduction chain, all collisions are resolved for P-wide sorted output list. For a P-way shift-reduction chain, P−1 pipeline stages are required.

We claim:

1. A parallel multi-way merge network comprising:
 a radix-based pre-sorter for sorting records based on a radix of a key of each record; and
 a plurality of parallel multi-way merge networks, each multi-way merge network only operating on records with keys having a certain radix,
 wherein the radix-based pre-sorter sorts each input record for input to a multi-way merge network operating on records having key with a radix matching the input record;
 wherein each record comprises a value-key pair and the radix of the key of each record is a predetermined number of least significant bits of the key portion of each record; and
 wherein each multi-way merge network is a hybrid network comprising:
  an independent register FIFO-based merge tree;
  one or more multi-stage comparison look-ahead merge networks; and
  an asynchronous FIFO coupled to the output of each multi-stage comparison look-ahead merge network, the asynchronous FIFO using a clock of the multi-stage comparison look-ahead merge network for writes to the FIFO and a clock of the independent register FIFO-based merge tree for reads from the FIFO, each asynchronous FIFO being an input to the independent register FIFO-based merge tree.

2. The network of claim 1 further comprising:
 a plurality of pre-fetch buffers, each pre-fetch buffer associated with a multi-way merge network, each pre-fetch buffer accepting inputs for the associated multi-way merge network from the radix-based pre-sorter.

3. The network of claim 1 wherein the radix is a q number of least significant bits of the key of each record and further wherein the number of multi-way merge networks is $2^q$.

4. The network of claim 1 wherein each hybrid network further comprises missing key check logic that, when no input record with a key having a radix matching an operating radix of the hybrid network exists, injects an artificial record having a key with a value of 0, and delays one or more following records.

5. The parallel multi-way merge network of claim 1, wherein each of the plurality of multi-way merge networks further comprises a full-throughput reducer comprising:
 a multiplier;
 a series of $\log_2 F$ adders; and
 a final adder;
 wherein F is a number of internal pipelines in each adder;
 wherein each adder in the series of adders:
  takes an input record and determines if a collision exists between the input record and a previous input record, a collision being indicated by a match of row indices of the input record and the previous record;
  if a collision is indicated, outputting a new record having as a key a row index and having as a value a sum of the values of the input record and the previous record;
  if no collision is indicated, outputting the previous record and holding the input record for comparison with a next record; and
 wherein the final adder:
  accumulates a sum with an incoming record via a feedback path, where the sum represents an accumulated result for all records having matching indices; and
  outputs the sum when no further matches are found between the input record and the sum.

* * * * *